United States Patent
Kang et al.

(10) Patent No.: US 11,086,388 B2
(45) Date of Patent: Aug. 10, 2021

(54) MEMORY CONTROLLER AND OPERATING METHOD THEREOF

(71) Applicant: SAMSUNG ELECTRONICS CO., LTD., Suwon-si (KR)

(72) Inventors: Hyun-Joon Kang, Hwaseong-si (KR); Tae-Hun Kim, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 371 days.

(21) Appl. No.: 15/957,611

(22) Filed: Apr. 19, 2018

(65) Prior Publication Data

US 2019/0050048 A1  Feb. 14, 2019

(30) Foreign Application Priority Data

Aug. 11, 2017  (KR) .................. 10-2017-0102560

(51) Int. Cl.
*G06F 1/3296* (2019.01)
*G06F 1/3234* (2019.01)
*G06F 1/3225* (2019.01)

(52) U.S. Cl.
CPC .......... *G06F 1/3296* (2013.01); *G06F 1/3225* (2013.01); *G06F 1/3275* (2013.01)

(58) Field of Classification Search
CPC ..... G06F 1/3296; G06F 1/3225; G06F 1/3275
See application file for complete search history.

(56) References Cited

U.S. PATENT DOCUMENTS

| 5,619,471 A | 4/1997 | Nunziata |
| 7,613,941 B2 | 11/2009 | Samson et al. |
| 7,752,470 B2 | 7/2010 | Huang et al. |

(Continued)

FOREIGN PATENT DOCUMENTS

| CN | 105512059 A | 4/2016 |
| KR | 10-1404943 | 6/2014 |

OTHER PUBLICATIONS

Intellectual Property Office of Singapore Office Action dated Dec. 6, 2018 Cited in Singapore Patent Application No. 10201804845P.

(Continued)

*Primary Examiner* — Jaweed A Abbaszadeh
*Assistant Examiner* — Gayathri Sampath
(74) *Attorney, Agent, or Firm* — Volentine, Whitt & Francos, PLLC

(57) ABSTRACT

A memory controller, an application processor, and a method of operating the memory controller can control performance and power consumption of an input/output device. The method includes allowing the memory device to enter a power down mode after an idle state is maintained for a first time period corresponding to a first setting value which is currently set, allowing the memory device to enter from the power down mode into an active state when access to the memory device occurs, determining a maintenance time of the power down mode to change the first setting value to a second setting value, based on a result obtained by monitoring a driving pattern of the memory device, and when the idle state is maintained for a second time period different from the first time period, allowing the memory device to enter the power down mode, based on the second setting value.

15 Claims, 20 Drawing Sheets

(56) References Cited

U.S. PATENT DOCUMENTS

| | | |
|---|---|---|
| 8,024,594 B2 | 9/2011 | Yong et al. |
| 8,458,429 B2 | 6/2013 | Dahan et al. |
| 8,601,301 B1 | 12/2013 | Arscott et al. |
| 9,170,639 B2 | 10/2015 | Henderson et al. |
| 9,442,554 B1 | 9/2016 | Arscott et al. |
| 9,691,449 B2 | 6/2017 | Sato et al. |
| 2005/0081002 A1 | 4/2005 | Chang et al. |
| 2007/0157046 A1 | 7/2007 | Samson et al. |
| 2009/0235247 A1 | 9/2009 | Cho et al. |
| 2009/0249102 A1* | 10/2009 | Yong ............. G06F 1/3225 713/324 |
| 2011/0153928 A1* | 6/2011 | Avudaiyappan ...... G06F 1/3275 711/109 |
| 2014/0181553 A1 | 6/2014 | Eckert et al. |
| 2014/0201551 A1 | 7/2014 | Imai et al. |
| 2015/0355705 A1 | 12/2015 | Weissmann et al. |
| 2016/0075293 A1 | 3/2016 | Chun |
| 2016/0103481 A1* | 4/2016 | Griffith ............. G06F 3/0625 713/323 |
| 2016/0239074 A1 | 8/2016 | Lee et al. |
| 2017/0024002 A1* | 1/2017 | Tzafrir ............. G06F 1/3228 |
| 2017/0068308 A1 | 3/2017 | Park et al. |
| 2019/0050252 A1* | 2/2019 | Arbel ............. G06F 3/064 |

OTHER PUBLICATIONS

Intellectual Property Office of India Office Action dated Oct. 13, 2020 Cited in Indian Patent Application No. 201844029435.

* cited by examiner

| PD MODE MAINTENANCE TIME | SET IDLE PERIOD |
|---|---|
| t2 > Ref 1 | DECREASE t1 PERIOD |
| Ref 2 < t2 ≤ Ref 1 | MAINTAIN t1 PERIOD |
| t2 ≤ Ref 2 | INCREASE t1 PERIOD |

FIG. 9

| PERIOD COMPARISON | REGISTER SETTING VALUE |
|---|---|
| T0 > T1 | N − α |
| T0 ≒ T1 | N |
| T0 < T1 | N + α |

N = CURRENT SETTING VALUE
α = INTEGER EQUAL TO OR MORE THAN ONE

FIG. 11A

| PERIOD COMPARISON | REGISTER SETTING VALUE |
|---|---|
| $\omega 0 \times T0 > \omega 1 \times T1$ | $N - \alpha$ |
| $\omega 0 \times T0 \fallingdotseq \omega 1 \times T1$ | $N$ |
| $\omega 0 \times T0 < \omega 1 \times T1$ | $N + \alpha$ |

FIG. 11B

| KIND OF EXECUTED PROGRAM | WEIGHT VALUE |
|---|---|
| FREQUENCY/NUMBER OF HIGH-PERFORMANCE PROGRAM ↑ | DECREASE WEIGHT VALUE ω0 AND/OR INCREASE WEIGHT VALUE ω1 |
| FREQUENCY/NUMBER OF LOW-PERFORMANCE PROGRAM ↑ | INCREASE WEIGHT VALUE ω0 AND/OR DECREASE WEIGHT VALUE ω1 |

FIG. 13

| PERIOD COMPARISON (T0−T1) OR (ω0×T0−ω1×T1) | REGISTER SETTING VALUE |
|---|---|
| FIRST STAGE | $N \pm \alpha$ |
| SECOND STAGE | $N \pm 2\alpha$ |
| ⋮ | ⋮ |
| kTH STAGE | $N \pm k\alpha$ |

MEMORY CONTROLLER AND OPERATING METHOD THEREOF

CROSS-REFERENCE TO RELATED APPLICATION

This application claims the benefit of Korean Patent Application No. 10-2017-0102560, filed on Aug. 11, 2017, in the Korean Intellectual Property Office, the disclosure of which is incorporated herein in its entirety by reference.

BACKGROUND

The inventive concept relates to a memory controller and an application processor, and more particularly, to a memory controller, an application processor, and an operating method of the memory controller, which control performance and power consumption of an input/output (I/O) device.

A memory controller and an application processor (AP) may be applied to an electronic system such as a data processing system and may input/output various signals to various peripheral devices. For example, the memory controller may control volatile memory devices such as dynamic random access memory (DRAM) or nonvolatile memory devices such as flash or resistive memories. Also, a function of the memory controller may be integrated into the AP, and the AP may control memory devices, display devices, and various I/O devices such as image sensors and communication chips.

In general, there is an idle period where access to a memory device is not performed in an operation of the data processing system. Accordingly, in order to decrease power consumption, control may be performed in order for the memory device to enter a power down mode after the idle period is maintained for a certain time. In this case, in consideration of power consumption and operation performance, it is required for optimized control to be performed on the memory device.

SUMMARY

The inventive concept provides a memory controller, an application processor, and an operating method of the memory controller, which perform optimized control on memory devices and other I/O devices.

According to an aspect of the inventive concept, there is provided a memory controller for controlling a memory device, the memory controller comprising: a driving characteristic monitor configured to monitor a driving pattern of the memory device by determining a time for which the memory device maintains a power down mode, and further configured to change a setting value associated with control of operation performance of the memory device, based a result of the monitoring; and a mode controller configured to control, while the memory device is operating, the operation performance of the memory device by varying a maintenance time period of an idle state corresponding to a condition for allowing the memory device to enter the power down mode, based on the setting value.

According to another aspect of the inventive concept, there is provided a method of operating a memory controller for controlling a memory device, the method comprising: allowing the memory device to enter a power down mode after an idle state is maintained for a first time period corresponding to a first setting value which is currently set; when access to the memory device occurs, allowing the memory device to transition from the power down mode into an active state; changing the first setting value to a second setting value based on a result obtained by monitoring a driving pattern of the memory device by determining a maintenance time of the power down mode; and when the idle state is maintained for a second time period different from the first time period, allowing the memory device to enter the power down mode, based on the second setting value.

According to yet another aspect of the inventive concept, there is provided a method of operating an application processor including one or more intellectual property blocks (IPs) which control a corresponding input/output (I/O) device, the operating method including controlling entry of the I/O device into a power down mode, based on a first setting value which is initially set, changing the first setting value to a second setting value when a system including the application processor is rebooted, based on detecting a maintenance time period of the power down mode of the I/O device, and controlling entry of the I/O device into the power down mode, based on the second setting value, wherein a clock enable signal provided to the I/O device is changed from an active state to an inactive state, for entering the power down mode, and wherein a maintenance time period of the active state of the clock enable signal before the I/O device enters the power down mode is changed based on the second setting value.

According to still another aspect of the inventive concept, there is provided a data processing system including a memory device and an application processor including a memory device and an application processor including a memory control unit for controlling the memory device, wherein the memory control unit includes a driving characteristic monitor configured to monitor a driving pattern of the memory device by determining a time period for which the memory device maintains a power down mode, and change a setting value associated with control of operation performance of the memory device, based a result of the monitoring and a mode controller configured to, while the memory device is operating, control the operation performance of the memory device by varying a maintenance time period of an idle state corresponding to a condition for allowing the memory device to enter the power down mode, based on the setting value.

According to a further aspect of the invention, a method comprises: monitoring a driving pattern of an input/output (I/O) device by determining a power down time period for which the I/O device maintains a power down mode before waking up to transition to an active state; and based on the determined power down time period, varying a maintenance time period of an idle state corresponding to a condition for allowing the I/O device to enter the power down mode, to increase an operating performance of the I/O device or to reduce an average power consumption of the I/O device.

BRIEF DESCRIPTION OF THE DRAWINGS

Embodiments of the inventive concept will be more clearly understood from the following detailed description taken in conjunction with the accompanying drawings.

FIGS. 4A and 4B are diagrams illustrating an exemplary embodiment of a concept of a monitoring and mode control operation according to.

FIG. 9 is an exemplary embodiment of a table showing an example modification of a setting value.

FIGS. 11A and 11B are tables showing an example where a setting value is changed based on an operation of the memory controller of FIG. 10.

FIG. 13 is a table showing another example of each of a period comparison operation and a setting value change operation.

DETAILED DESCRIPTION OF THE EMBODIMENTS

Hereinafter, embodiments will be described in detail with reference to the accompanying drawings.

Figure 1:
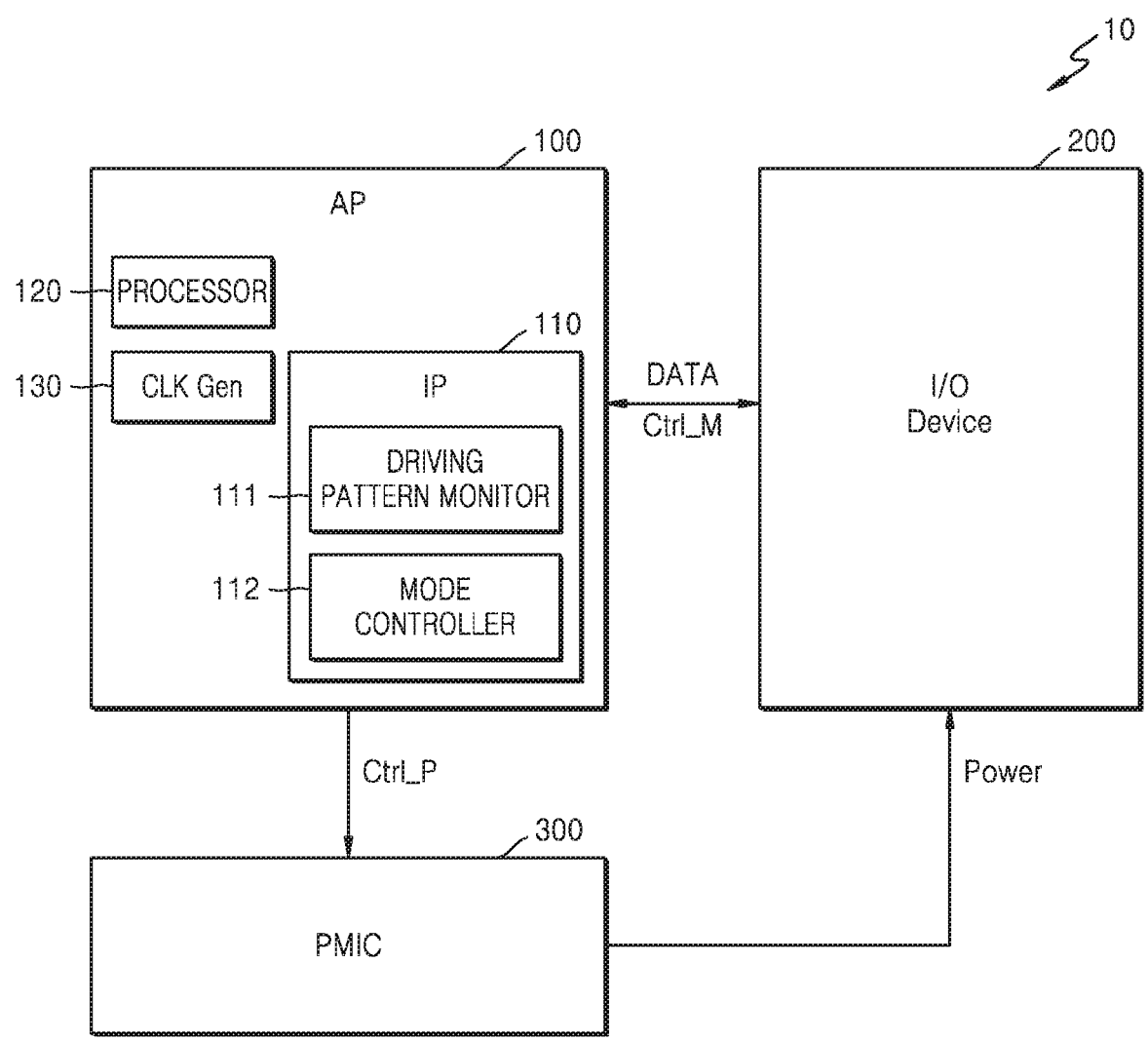
FIG. 1 is a block diagram illustrating an exemplary embodiment of a data processing system including an AP.

FIG. 1 is a block diagram illustrating an exemplary embodiment of a data processing system 10 including an application processor (AP).

Data processing system 10 may include an AP 100 and an I/O device 200. I/O device 200 may correspond to a peripheral device of AP 100, and for example, may be one of various kinds of devices which input/output information to AP 100. According to an embodiment, I/O device 200 may be a device which transmits/receives data DATA to/from AP 100, and for example, I/O device 200 may include a memory device. Also, data processing system 10 may further include a power management integrated circuit (PMIC) 300 for controlling power supplied to internal elements of AP 100 and/or I/O device 200.

AP 100 may be implemented as a system-on chip (SoC). The SoC may include a system bus (not shown) to which a protocol having a bus standard is applied, and may include various kinds of intellectual property cores or blocks ("IPs") 110 connected to the system bus. Also, AP 100 may further include a processor 120 and a clock generator 130. In FIG. 1, for convenience of description, one IP 110 is illustrated, but is not limited thereto. In other embodiments, AP 100 may include one or more master IPs and one or more slave IPs.

Processor 120 may control an overall operation of AP 100. According to an embodiment, processor 120 may control IP 110 included in AP 100. Also, according to an embodiment, processor 120 may control AP 100 by executing software loaded into an internal or external working memory (not shown) of AP 100. As an example of an operation, AP 100 may provide a power control signal Ctrl_P for controlling PMIC 300, and PMIC 300 may control power supplied to I/O device 200 in response to the power control signal Ctrl_P.

IP 110 may control an operation of I/O device 200, and for example, may control I/O device 200 to operate according to various modes. According to an exemplary embodiment, IP 110 may include a driving pattern monitor 111 and a mode controller 112. Driving pattern monitor 111 may monitor whether a driving pattern of I/O device 200 is driven based on a high performance characteristic or a low power characteristic. An operation of monitoring the driving pattern may be variously performed. According to an embodiment, driving pattern monitor 111 may monitor operation modes (or a duration of a mode period) of I/O device 200 to monitor the driving pattern of I/O device 200. Also, mode controller 112 may provide a mode control signal Ctrl_M to I/O device 200 for controlling an operation mode of I/O device 200, based on a monitoring result of driving pattern monitor 111.

According to an embodiment, mode controller 112 may control the operation mode of I/O device 200 in order for I/O device 200 to be driven according to a higher performance characteristic than current performance or a lower power characteristic than a current power level, based on a result obtained by monitoring the driving pattern of I/O device 200. For example, there may be an idle period where data processing system 10 does not access I/O device 200, and mode controller 112 may output the mode control signal Ctrl_M so that I/O device 200 enters a power down mode (or a sleep mode) after the idle period is maintained for a certain time period or interval. In this case, as the frequency or number of entries of I/O device 200 into the power down mode increases, I/O device 200 may be driven based on the low power characteristic, but as the frequency or number of entries of I/O device 200 into the power down mode decreases, I/O device 200 may be driven based on the high performance characteristic.

Based on the result obtained by monitoring the driving pattern, when the driving pattern of I/O device 200 corresponds to the high performance characteristic, mode controller 112 may control the operation mode of I/O device 200 to decrease the frequency or number of entries of I/O device 200 into the power down mode. On the other hand, when the driving pattern of I/O device 200 corresponds to the low power performance characteristic, mode controller 112 may control the operation mode of I/O device 200 to increase the frequency or number of entries of I/O device 200 into the power down mode. The monitoring and the mode control operation may be performed a plurality of times while data processing system 10 is operating, and based on the monitoring result, the operation mode may be continuously controlled in order for I/O device 200 to be driven more suitably for the high performance characteristic, or the operation mode may be controlled in order for I/O device 200 to be driven suitably for the low power performance characteristic.

On the assumption that I/O device 200 is a memory device such as DRAM, an example of a detailed operation according to an exemplary embodiment will be described below.

When an idle period where there is no DRAM traffic in data processing system 10 is maintained for a certain time period or interval, I/O device 200 may enter the power down mode according to control by IP 110. Also, driving pattern monitor 111 may detect a time interval or period for which I/O device 200 maintains the power down mode, and may generate a result obtained by monitoring the driving pattern of I/O device 200, based on a result of the detection. For example, when the time interval or period for which the power down mode is maintained is less than a reference value, the monitoring result may indicate that the driving pattern of I/O device 200 corresponds to the high performance characteristic. On the other hand, when the time interval or period for which the power down mode is maintained is equal to or greater than the reference value, the monitoring result may indicate that the driving pattern of I/O device 200 corresponds to the low power characteristic.

Mode controller 112 may increase or decrease the frequency or number of entries of I/O device 200 into the power down mode, based on the monitoring result. For example, I/O device 200 may enter the power down mode after the idle period of I/O device 200 is maintained by a setting value (for example, an idle maintenance time period or interval), and the setting value may increase or decrease based on the monitoring result. For example, when a time period or interval for which I/O device 200 maintains the power down mode is short, the setting value may increase through an operation of changing the setting value, and thus mode controller 112 may decrease the frequency or number of entries of I/O device 200 into the power down mode. That is, since I/O device 200 enters the power down mode when the idle period of I/O device 200 is maintained by an increased setting value, the frequency or number of entries of I/O device 200 into the power down mode may be reduced. On the other hand, when the time interval or period for which I/O device 200 maintains the power down mode is relatively long, the setting value may decrease, and thus, mode controller 112 may increase the frequency or number of entries of I/O device 200 into the power down mode.

According to an exemplary embodiment, an idle maintenance time period or interval corresponding to a criterion for allowing I/O device 200 to enter the power down mode may be flexibly changed while data processing system 10 is operating. That is, a use characteristic of an individual user who uses data processing system 10 may be monitored in real time, and the frequency or number of entries into the power down mode may be controlled adaptively to the user, based on a result of the monitoring, whereby I/O device 200 may be driven to have a power characteristic and performance optimized to a characteristic of the user.

A clock signal and power supplied to I/O device 200 may be controlled based on the operation mode of I/O device 200. For example, when I/O device 200 enters the power down mode, a level of power supplied from PMIC 300 may be reduced, or the supply of the power to I/O device 200 may be blocked. Also, the frequency of the clock signal from clock generator 130 may be reduced, or the supply of the clock signal to I/O device 200 may be blocked.

In FIG. 1, an example where an embodiment is applied to the AP, the IP of the AP, and the memory controller has been described, but the present embodiment is not limited thereto. For example, an embodiment may be applied to various devices for controlling the operation mode (e.g., the power down mode) of the I/O device.

Figure 2:
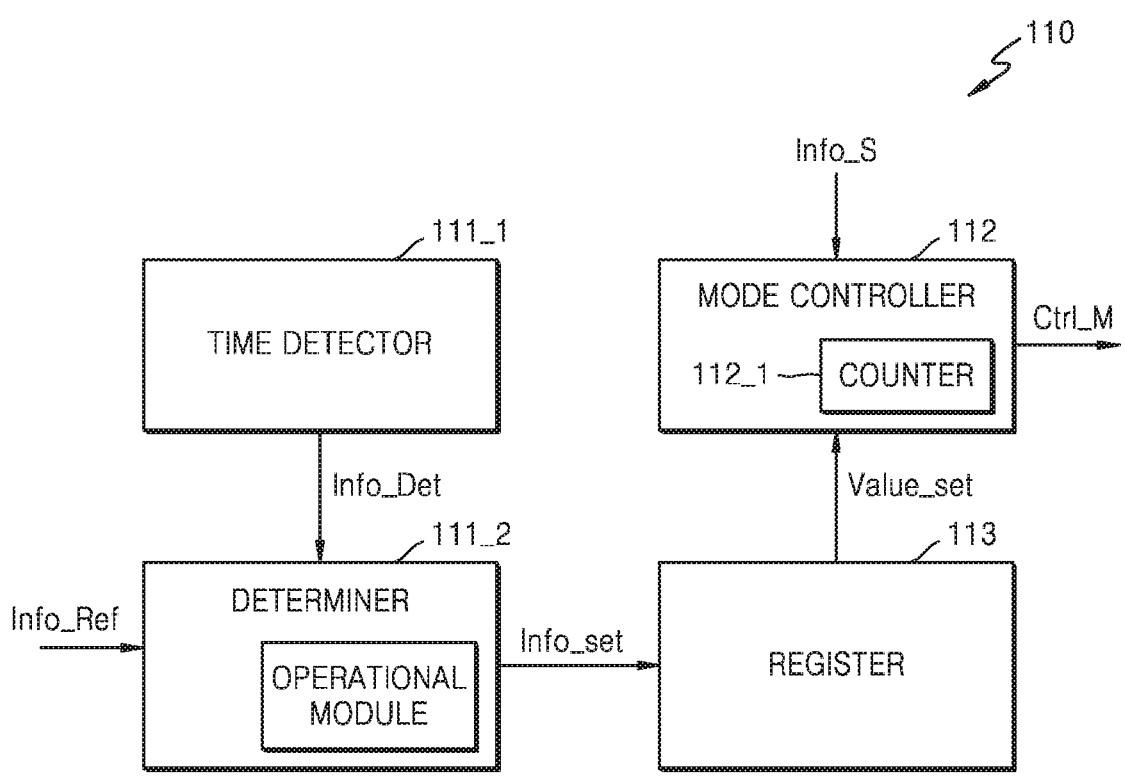
FIG. 2 is a block diagram illustrating an implementation example of an intellectual property core or block ("IP") of FIG. 1.

FIG. 2 is a block diagram illustrating an implementation example of IP 110 of FIG. 1.

Referring to FIGS. 1 and 2, IP 110 may include a time detector 111_1, a determiner 111_2, a mode controller 112, and a register 113. According to an exemplary embodiment, time detector 111_1 and determiner 111_2 may be elements included in the driving pattern monitor 111 of FIG. 1. Also, time detector 111_1 may detect a time period or interval (for example, a mode maintenance time period or interval) for which each of various operation modes of I/O device 200 is maintained, and for example, time detector 111_1 may detect a time period or interval for which I/O device 200 maintains the power down mode.

Time detector 111_1 may detect a time period or interval for which I/O device 200 maintains the power down mode and may output first information Info_Det based on a result of the detection. For example, I/O device 200 may enter the power down mode after the idle period is maintained for a certain time period or interval. Also, as traffic occurs in I/O device 200, an operation mode of I/O device 200 may be changed from the power down mode to a normal mode (or an active mode). According to an implementation example, time detector 111_1 may include a counter (not shown) for detecting a time period or interval, based on a counting operation.

Determiner 111_2 may determine a time period or interval for which I/O device 200 maintains the power down mode, based on the first information Info_Det. For example, determiner 111_2 may receive reference information Info_Ref and may perform a determination operation using the first information Info_Det and the reference information Info_Ref. For example, determiner 111_2 may include an operational module, and the operational module may generate second information Info_Set for changing a setting value Value_set of register 113, based on a result obtained by comparing the first information Info_Det and the reference information Info_Ref and may provide the second information Info_Set to register 113. For example, if the first information Info_Det is greater than the reference information Info_Ref and thus a time period or interval for which I/O device 200 maintains the power down mode is longer than a reference time period or interval, the second information Info_Set may include information for decreasing the setting value Value_set of register 113. On the other hand, if the first information Info_Det is less than the reference information Info_Ref, the second information Info_Set may include information for increasing the setting value Value_set of register 113.

Mode controller 112 may output the mode control signal Ctrl_M for controlling the operation mode of I/O device 200. As an operation example, mode controller 112 may change the operation mode of I/O device 200 from an idle state to the power down mode, based on the setting value Value_set. For example, mode controller 112 may include a counter 112_1 and may perform a counting operation, based on third information Info_s indicating that I/O device 200 enters the idle state. For example, counter 112_1 may count down from the setting value Value_set, and when the idle period is maintained by the setting value Value_set (or when a counting result reaches zero), mode controller 112 may output the mode control signal Ctrl_M for changing the operation mode of I/O device 200 from the idle state to the power down mode.

For example, according to an embodiment, when the setting value Value_set decreases, counter 112_1 may count down from the setting value Value_set corresponding to a smaller value, and thus, a frequency or number of entries of I/O device 200 into the power down mode may increase. That is, the setting value Value_set may be continuously reduced based on a characteristic of a user who uses data processing system 10, and thus, I/O device 200 may be driven so as to be optimized to the low power characteristic. On the other hand, when the setting value Value_set continuously increases, I/O device 200 may be driven so as to be optimized to the high performance characteristic. That is, according to an embodiment, the setting value Value_set may be changed based on a use characteristic of an individual user periodically or in real time without being fixed as a specific value.

In the embodiment of FIG. 2, register 113 is illustrated as an element disposed outside mode controller 112, but this is merely an embodiment. In other embodiments, register 113 may be disposed inside driving pattern monitor 111 or mode controller 112. Also, in FIG. 2, the second information Info_Set may include a setting value which is to be changed, or may include control information for increasing or decreasing the setting value of register 113.

In the embodiment of FIG. 2, an example where counter 112_1 counts down from the setting value Value_set is described, but the present embodiment is not limited thereto. For example, counter 112_1 may start counting down from zero and may count down from zero to the setting value Value_set.

Various functions illustrated in FIG. 2 may be implemented with software or hardware. For example, the various functions illustrated in FIG. 2 may be implemented with software executed by the processor (or a central processing unit (CPU)) 120. Alternatively, the various functions illustrated in FIG. 2 may be implemented with hardware including one or more circuit elements. Alternatively, the various functions illustrated in FIG. 2 may be implemented by a combination of hardware and software.

Figure 3:
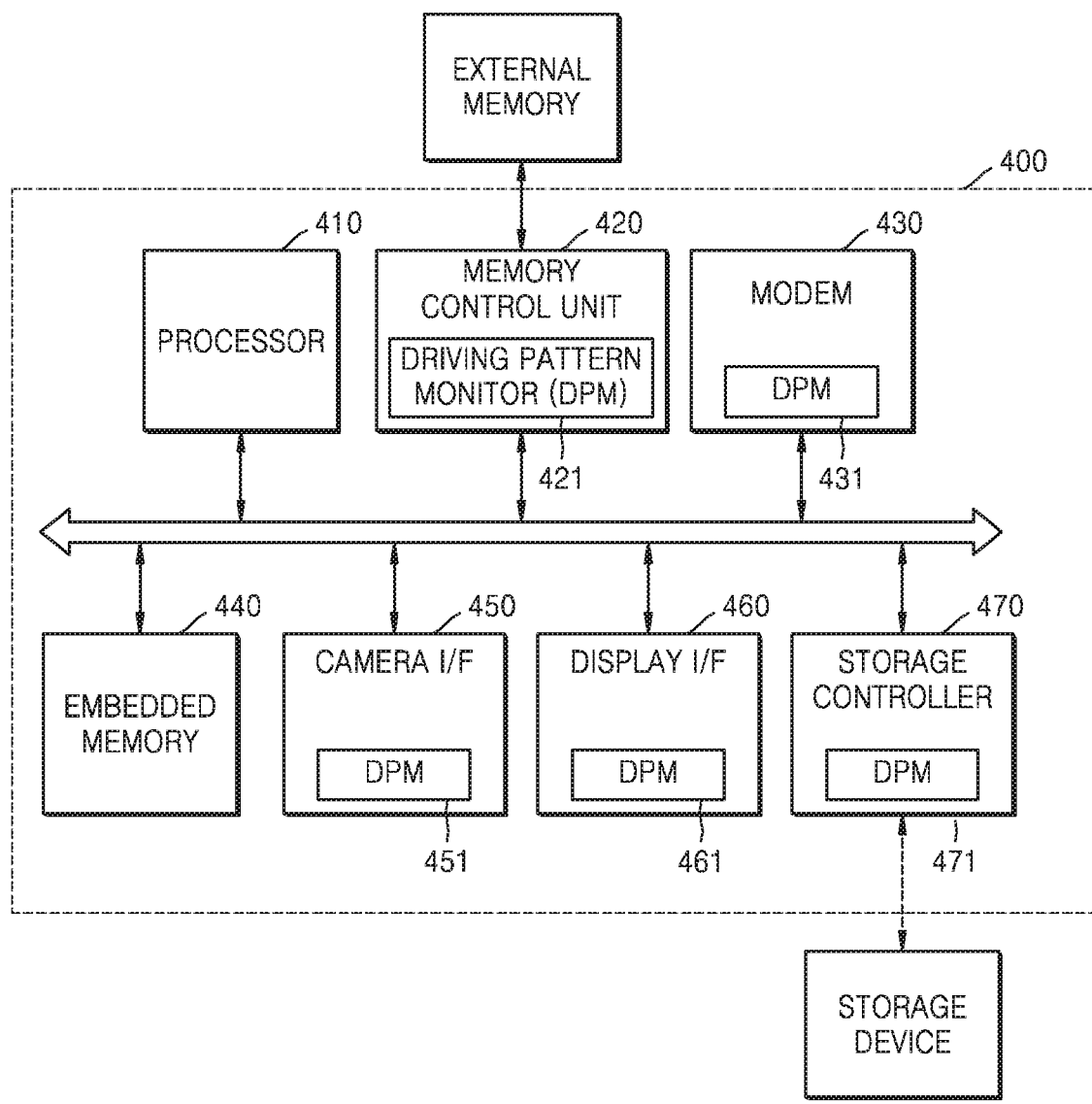
FIG. 3 is a block diagram illustrating an exemplary embodiment of an AP.

FIG. 3 is a block diagram illustrating an exemplary embodiment of AP 400.

Referring to FIG. 3, AP 400 may include one or more IPs, and for example, AP 400 may include a processor 410, a memory control unit 420, a modem 430, an embedded memory 440, a camera interface (I/F) 450, a display interface (I/F) 460, and a storage controller 470 which are connected to one another through a system bus. Also, memory control unit 420 may control a memory operation on an external memory or embedded memory 440. Also, storage controller 470 may control an external storage device. The elements illustrated in FIG. 3 are merely an embodiment. In other embodiments, AP 400 may further include other elements in addition to the elements illustrated in FIG. 3, or some of the elements illustrated in FIG. 3 may not be included in AP 400. Also, since modem 430 is included in AP 400, AP 400 may be referred to as ModAP.

A standard of the system bus of AP 400 may use advanced microcontroller bus architecture (AMBA) protocol of Advanced RISC Machine (ARM). A bus type of the AMBA protocol may include advanced high-performance bus (AHB), advanced peripheral bus (APB), advanced eXtensible interface (AXI), AX14, AXI coherency extensions (ACE), and/or the like. In addition, other types of protocols such as nNetwork of SONICs Inc., CoreConnect of IBM, open core protocol of OCP-IP, and/or the like may be applied to the system bus.

Processor 410 may control an overall operation of AP 400. For example, software for managing operations of various IPs included in AP 400 may be loaded into the external memory and/or embedded memory 440, and processor 410 may perform various management operations by executing the loaded software. The external memory may be implemented with a volatile memory, and according to an embodiment, the external memory may include a volatile memory such as DRAM and/or static random access memory (SRAM). Also, a storage device may include a non-volatile memory and may include a cell having a feature where stored data is maintained even when power is cut off, for example, may include NAND or NOR flash memory or may include various kinds of non-volatile memories such as magnetic RAM (MRAM), resistance RAM (RRAM), ferroelectric RAM (FRAM), and phase change memory (PCM).

According to the above-described embodiment, each of the various IPs of AP 400 may access an external I/O device corresponding thereto and may perform a monitoring operation on a driving pattern of the external I/O device. Also, each of the various IPs of AP 400 may control an operation mode of the external I/O device, based on a result obtained by performing the monitoring operation. For example, memory control unit 420 may include a driving pattern monitor 421, and driving pattern monitor 421 may monitor a driving pattern of an external memory through the detection and determination operations according to the above-described embodiment. Also, memory control unit 420 may control the operation mode of the external memory, based on a monitoring result, and thus, the external memory may be controlled to be driven based on a high performance characteristic or driven based on a low power characteristic.

Similarly, storage controller 470 may include a driving pattern monitor 471, and identically or similarly to the above-described embodiment, driving pattern monitor 471 may monitor a driving pattern of the storage device. Also, storage controller 470 may control an operation mode of the storage device, based on a result of the monitoring.

Although not shown in FIG. 3, modem 430 may communicate with an external chip (for example, a radio frequency (RF) chip), and a driving pattern monitor 431 of the modem 430 may monitor a driving pattern of an external chip. Similarly, camera interface 450 may include a driving pattern monitor 451, and driving pattern monitor 451 may monitor a driving pattern of a camera controlled by camera interface 450. Also, display interface 460 may include a driving pattern monitor 461, and driving pattern monitor 461 may monitor a driving pattern of a display device controlled by display interface 460. Although not shown in FIG. 3, according to the above-described embodiment, each of the various IPs of AP 400 may include a register that stores a setting value, and may control an operation mode of a corresponding external I/O device by changing the setting value, based on a monitoring result.

Figures 4A, 4B:
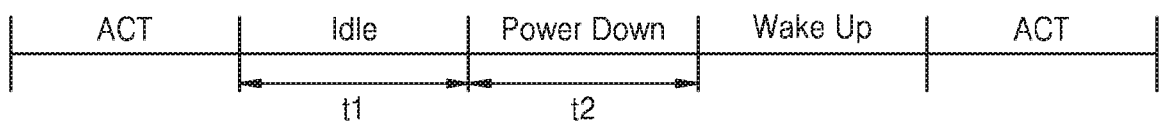

FIGS. 4A and 4B are diagrams illustrating a concept of a monitoring and mode control operation according to an exemplary embodiment.

FIG. 4A illustrates an example of various operation modes of an I/O device. Referring to FIG. 4A, the I/O device may operate normally during an active period Act. When access to the I/O device does not occur, the I/O device may enter an idle state during an idle period Idle, and after the idle period Idle is maintained for a time period or interval t1, the I/O device may enter a power down mode Power Down. Also, when access to the I/O device occurs, the I/O device may undergo a wake-up period Wake Up, and then may operate normally during the active period Act. In the embodiment of FIG. 4A, it is assumed that the power down mode Power Down is maintained for a time period or interval t2.

FIG. 4B illustrates an example where a driving pattern of an I/O device is monitored based on a maintenance time period or interval t2 of a power down mode of the I/O device. The maintenance time period or interval t2 of the power down mode may be compared with one or more reference values, for example, first and second reference values Ref1 and Ref2, as shown in FIG. 4B, where the first reference value Ref1 may have a value which is greater than the second reference value Ref2.

For example, if the maintenance time period or interval t2 of the power down mode is greater than the first reference value Ref1, a maintenance time period or interval t1 of an idle period may decrease by changing the above-described setting value. Also, if the maintenance time period or interval t2 of the power down mode is greater than the second reference value Ref2 and equal to or less than the first reference value Ref1, the setting value may be maintained without changing the maintenance time period or interval t1 of the idle period. Also, if the maintenance time period or interval t2 of the power down mode is equal to or less than the second reference value Ref2, the maintenance time period or interval t1 of the idle period may increase by changing the setting value.

Figure 5:
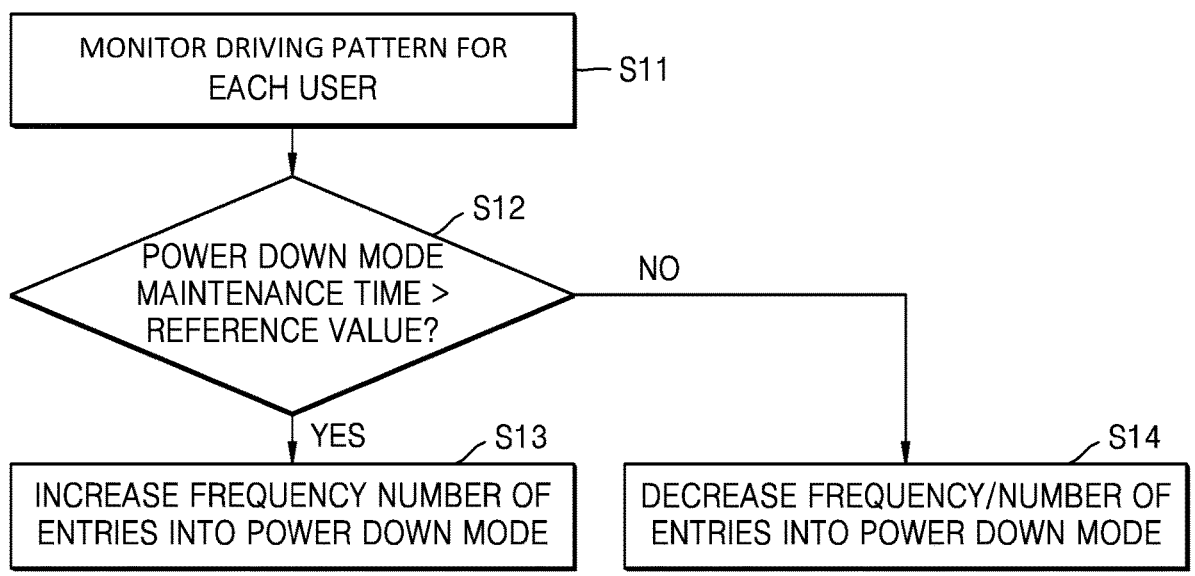
FIGS. 5 and 6 are flowcharts illustrating an exemplary embodiment of an operating method of an AP.
Figure 6:
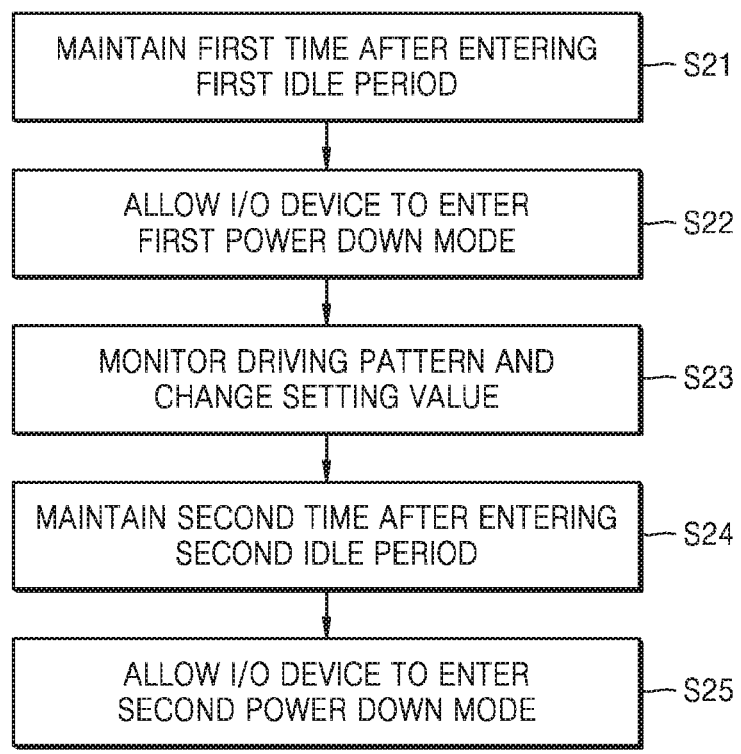

FIGS. 5 and 6 are flowcharts illustrating an example embodiment of an operating method of an AP. In FIGS. 5 and 6, if a device which is to be driven is a memory device, the flowcharts of FIGS. 5 and 6 may correspond to an operating method of a memory controller.

Referring to FIG. 5, in operation S11, an AP may monitor driving patterns of one or more I/O devices for each of users of the one or more I/O devices. As an example of a monitoring operation, a time period or interval for which an I/O device maintains the power down mode may be monitored, and whether the time period or interval for which the power down mode is maintained is greater than a reference value may be determined in operation S12. For example if the time period or interval for which the power down mode is maintained is greater than the reference value, this may indicate that the I/O device is driven based on the low power characteristic and thus the power down mode is maintained for a long time period or interval, and thus, the AP may increase a frequency or number of entries of the I/O device into the power down mode in order for the I/O device to be driven more suitably for the low power characteristic in operation S13. On the other hand, if the time period or interval for which the power down mode is maintained is equal to or less than the reference value, this may indicate that the I/O device is driven based on the high performance characteristic and thus the power down mode is maintained for a short time period or interval, and thus, the AP may decrease the frequency or number of entries of the I/O device into the power down mode in order for the I/O device to be driven more suitably for the high performance characteristic in operation S14.

FIG. 6 illustrates a detailed example of each of a driving pattern monitoring operation and a mode control operation.

Referring to FIG. 6, when a data processing system including an AP is initially driven, an initial setting value associated with a power down mode of one or more I/O devices may be stored in the AP. For example, the setting value may be non-volatilely stored in the data processing system, and when the data processing system is initially driven, the setting value may be stored in a register included in the AP.

The AP (or an IP of the AP) may drive an I/O device, and when access to the I/O device does not occur, the I/O device may enter a first idle period. Also, the I/O device may enter the first idle period and may maintain the first idle period for a first time period or interval corresponding to the initial stored setting value in operation S21.

The AP may determine that the first idle period is maintained for the first time period or interval, and may allow the I/O device to enter a first power down mode in operation S22. Subsequently, when access to the I/O device occurs, the first power down mode may stop, and the I/O device may undergo a wake-up period and then may operate normally during an active period.

The AP may monitor a driving pattern of the I/O device and may change the setting value, based on a result of the monitoring in operation S23. For example, the AP may monitor an idle period, a power down mode period, and a wake-up period of the I/O device, and based on a result of the monitoring, the driving pattern of the I/O device may be determined for each of a plurality of users who use a corresponding system. For example, according to the above-described embodiment, the setting value may be changed by comparing a reference value with a time period or interval for which the power down mode is maintained. Alternatively, according to a modified embodiment, the setting value may be changed based on a result obtained by comparing a time period or interval, for which the power down mode is maintained, with another time period.

A changed setting value obtained through the comparison result may be stored in the AP, and the I/O device may be driven based on the changed stored setting value. For example, when access to the I/O device does not occur, the I/O device may enter a second idle period. Also, the I/O device may enter the second idle period and may maintain the second idle period for a second time period or interval corresponding to the changed stored setting value in operation S24. The AP may determine that the second idle period is maintained for the changed second time period or interval, and may allow the I/O device to enter the second power mode in operation S25.

Hereinafter, an example of a detailed operation of an embodiment of a memory controller will be described. The memory controller may be a memory control module included in an AP. Alternatively, the memory controller may be a device which is individually implemented. For example, an example where the memory controller drives a DRAM corresponding to an I/O device will be described.

Figure 7:
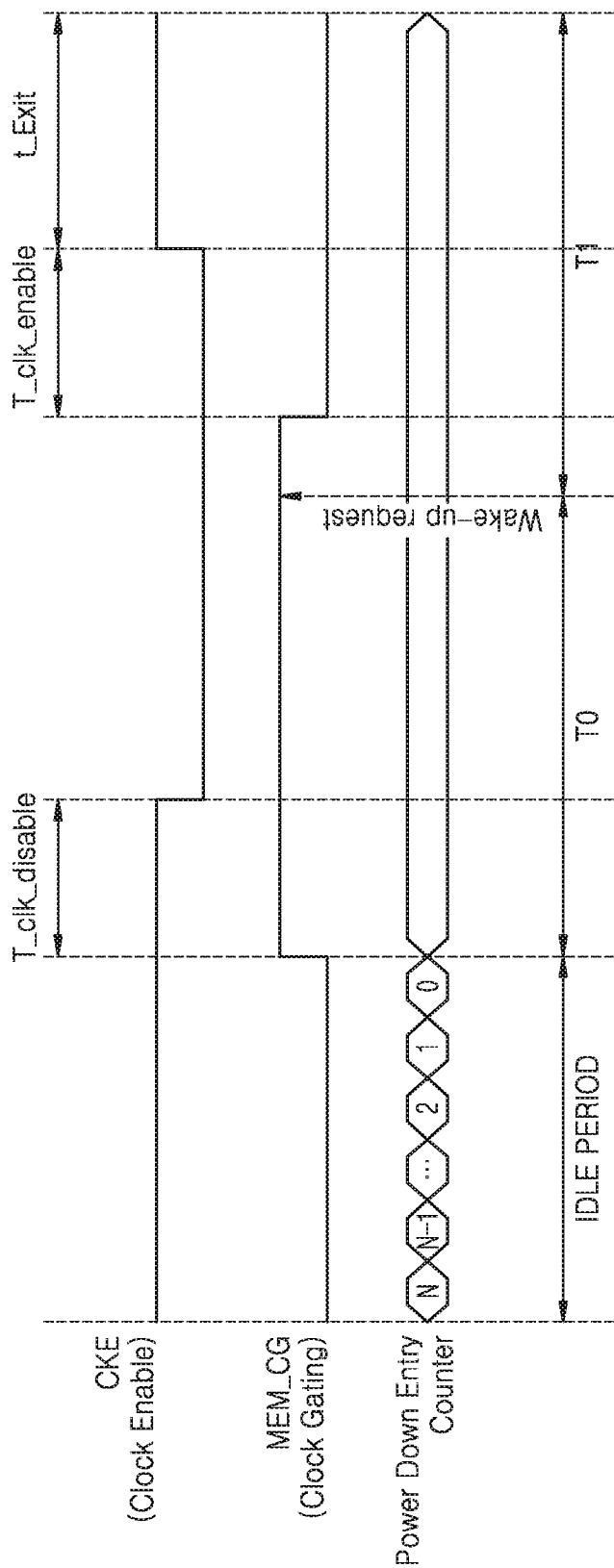
FIG. 7 is a waveform diagram showing an example of various signals provided to a DRAM.

The memory controller may provide various clock signals to the DRAM and may transmit or receive data to or from the DRAM in synchronization with a clock signal. In FIG. 7, a clock enable signal CKE provided to the DRAM is shown, and a clock gating signal MEM_CG for controlling an operating clock (not shown) provided to the DRAM is shown.

In a system to which the memory controller and the DRAM are applied, when an idle state where access to the DRAM does not occur is maintained for a certain time period or interval, the memory controller may allow the DRAM to enter the power down mode. On the other hand, when access to the DRAM occurs without the idle state being maintained for the certain time period or interval, the DRAM may remain in a normal operating state without entering the power down mode.

According to an embodiment, the memory controller may continuously monitor a driving pattern of the DRAM, and an idle maintenance time period or interval corresponding to a criterion for allowing the DRAM to enter the power down mode may be changed while the system is operating. Identically or similarly to the above-described embodiment, when it is required to drive the DRAM with high performance according to a use characteristic of a user, the memory controller may increase a setting value of the idle maintenance time period or interval, and thus, may decrease a frequency or number of entries of the DRAM into the power down mode. On the other hand, when it is required to drive the DRAM with low power according to the use characteristic of the user, the memory controller may decrease a setting value of the idle maintenance time period or interval, and thus, may increase the frequency or number of entries of the DRAM into the power down mode. That is, in an embodiment of a system including the memory controller and the DRAM, a setting value of the system may be differently changed based on a use characteristic of a user who uses the system.

Referring again to FIG. 7, as the DRAM enters the idle period, the clock enable signal CKE may have a logic high state, and the clock gating signal MEM_CG may have a logic low state, during the idle period. Also, the memory controller may count a time period or interval for which the idle state is maintained, and for example, if a setting value for entering the power down mode is set as an N value, the memory controller may count down, decreasing the setting value from the N value by one for each count.

When access to the DRAM does not occur before the counting value becomes zero, the memory controller may allow the DRAM to enter the power down mode. For example, as the DRAM enters the power down mode, the clock gating signal MEM_CG for clock gating on a PHY logic acting as an interface between the memory controller and the DRAM may be changed to a logic high level. Also, after a certain time period or interval T_clk_disable elapses, the memory controller may change the clock enable signal CKE, provided to the DRAM, to a logic low level.

Subsequently, when access to the DRAM occurs in a power down mode period, the memory controller may perform a preparation operation of changing an operation mode of the DRAM to the active mode. For example, the memory controller may change the clock gating signal MEM_CG to a logic low level, and thus, a clock signal may be supplied to a PHY block of the memory controller. Also, the clock gating signal MEM_CG may be changed to a logic low level, and then, after a certain time period or interval T_clk_enable elapses, the clock enable signal CKE may be changed to a logic high level, whereby the clock signal may be supplied to the DRAM. Also, the clock enable signal CKE may be changed to a logic high level, and then, after a set time period or interval t_Exit elapses, access to the DRAM may be normally performed.

As described above, the DRAM may operate according to various time periods, and a driving pattern may be monitored by using at least some of the various periods. For example, a time period where counting down is performed after access to the DRAM does not occur may be defined as an idle period. Also, a power down mode period T0 may be defined as a time period between a time when counting down ends and a time when access to the DRAM occurs. Also, a wake-up period T1 may be defined as a time period between a time when access to the DRAM occurs and a time when normal access to the DRAM is possible. The wake-up time period T1 may correspond to a time period which acts as an overhead for the DRAM exiting from the power down mode.

According to an embodiment, an operation of monitoring the driving pattern of the DRAM may be performed by comparing the power down mode period T0 and the wake-up period T1.

Figure 8:
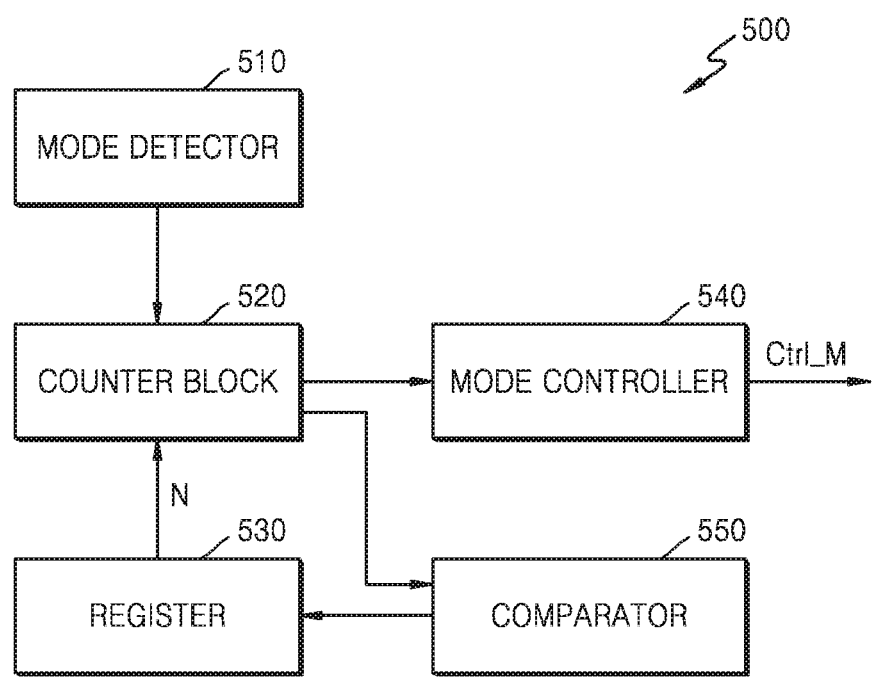
FIG. 8 is a block diagram illustrating an implementation example of a memory controller for monitoring a driving pattern and performing mode control.

FIG. 8 is a block diagram illustrating an implementation example of a memory controller for monitoring a driving pattern and performing mode control, based on the operation illustrated in FIG. 7, and FIG. 9 is an exemplary embodiment of a table showing an example of a modification of a setting value.

Referring to FIGS. 7 and 8, a memory controller 500 may include a mode detector 510, a counter block 520, a register 530, a mode controller 540, and a comparator 550. As in the above-described embodiment, various function blocks of memory controller 500 illustrated in FIG. 8 may be implemented with hardware, or may be implemented by a combination of hardware and software.

Mode detector 510 may detect the various modes shown in FIG. 7 and may provide a result of the detection to counter block 520. For example, mode detector 510 may detect a time when each of the various periods such as the idle period, the power down mode period, etc. starts or ends. Also, mode detector 510 may detect a time when a logic state of the clock gating signal MEM_CG is changed, and may detect a time when a logic state of the clock enable signal CKE is changed. Also, mode detector 510 may detect a time when access to the DRAM occurs in the power down mode period.

Counter block 520 may include one or more counters for generating one or more counting results. For example, counter block 520 may include a counter that counts down based on a setting value N stored in register 530, for determining whether to enter the power down mode. Also, counter block 520 may further include a counter for counting the above-described power down mode period T0, and counter block 520 may further include a counter for counting the above-described wake-up period T1.

The one or more counting results generated by counter block 520 may be provided to comparator 550. Comparator 550 may perform a comparison operation on the received counting result and may change the setting value N stored in register 530, based on a comparison result. For example, comparator 550 may compare a counting result (a first counting result) generated during the power down mode period T0 and a counting result (a second counting result) generated during the wake-up period T1. Identically or similarly to the above-described embodiment, a case where the first counting result is greater than the second counting result may correspond to a case where the power down mode period T0 is relatively long, and thus, the setting value N may decrease in order for the DRAM to be driven based on the low power characteristic. On the other hand, a case where the first counting result is less than the second counting result may correspond to a case where the power down mode period T0 is relatively short, and thus, the setting value N may increase in order for the DRAM to be driven based on the high performance characteristic.

Referring to FIG. 9, the comparison operation and an operation of changing the setting value N based thereon may be performed in various manners. For example, when the power down mode period T0 is longer than the wake-up period T1, the setting value N may decrease by $\alpha$. On the other hand, when the power down mode period T0 is shorter than the wake-up period T1, the setting value N may increase by $\alpha$. Alternatively, when the power down mode period T0 is equal or similar to the wake-up period T1, the setting value N may be maintained without being changed. The setting value N being maintained when the power down mode period T0 is similar to the wake-up period T1 can be understood as that the setting value N is changed only when a difference between the power down mode period T0 and the wake-up period T1 is equal to or greater than a certain range or threshold.

The setting value N may be changed in various manners. For example, the setting value N may correspond to an integer value from which counting down starts, and when $\alpha$ corresponds to a value "1", the setting value N may decrease or increase by one. Alternatively, $\alpha$ may be an arbitrary integer greater than one, and in this case, the setting value N may decrease or increase in units of integers greater than one. Alternatively, in a modified embodiment, a value of α may be adaptively changed based on the difference between the power down mode period T0 and the wake-up period T1. For example, when the difference between the power down mode period T0 and the wake-up period T1 is relatively small, the value of α may have a relatively small value. On the other hand, when the difference between the power down mode period T0 and the wake-up period T1 is relatively large, the value of α may have a relatively large value.

The comparison operation and the operation of changing the setting value may be performed a plurality of times while a system is being driven. Therefore, based on a comparison result, the setting value N may continuously increase, and when the setting value N is changed to a very large value, a frequency of number of entries of the DRAM into the power down mode may be greatly reduced. Also, as the value of α is defined as a large value, change to the high performance characteristic or the low power characteristic may be quickly performed, and as the value of α is defined as a small value, the high performance characteristic or the low power characteristic may be precisely controlled.

The power down mode period T0 and the wake-up period T1 for determining a driving pattern according to an embodiment are not limited to the periods shown in FIG. 7. That is, periods compared with each other for determining a driving pattern according to an embodiment may be variously set. For example, the start of the power down mode period T0 may correspond to a time when the clock enable signal CKE is changed to a logic low level. Also, an end time of the power down mode period T0 may correspond to a time when the clock gating signal MEM_CG is changed to a logic low level or the clock enable signal CKE is changed to a logic high level.

Moreover, for example, the start of the wake-up period T1 may correspond to a time which is the same as or different from an end time of the power down mode period T0. The end time of the wake-up period T1 may also be variously set.

Moreover, in the above-described embodiment, for convenience of description, a simple comparison between the power down mode period T0 and the wake-up period T1 has been described, but the wake-up period T1 may be a very short time period or interval based on a defined specification. In this case, a constant defined as a certain value may be multiplied by at least one of the power down mode period T0 and the wake-up period T1, and periods by which the constant is multiplied may be compared with each other. Also, the comparison between the periods by which the constant is multiplied may be identically applied to various comparison operations described below in the following embodiments.

Hereinafter, various modification embodiments will be described. The following embodiments are merely example embodiments, and the described embodiments may be variously modified.

Figure 10:
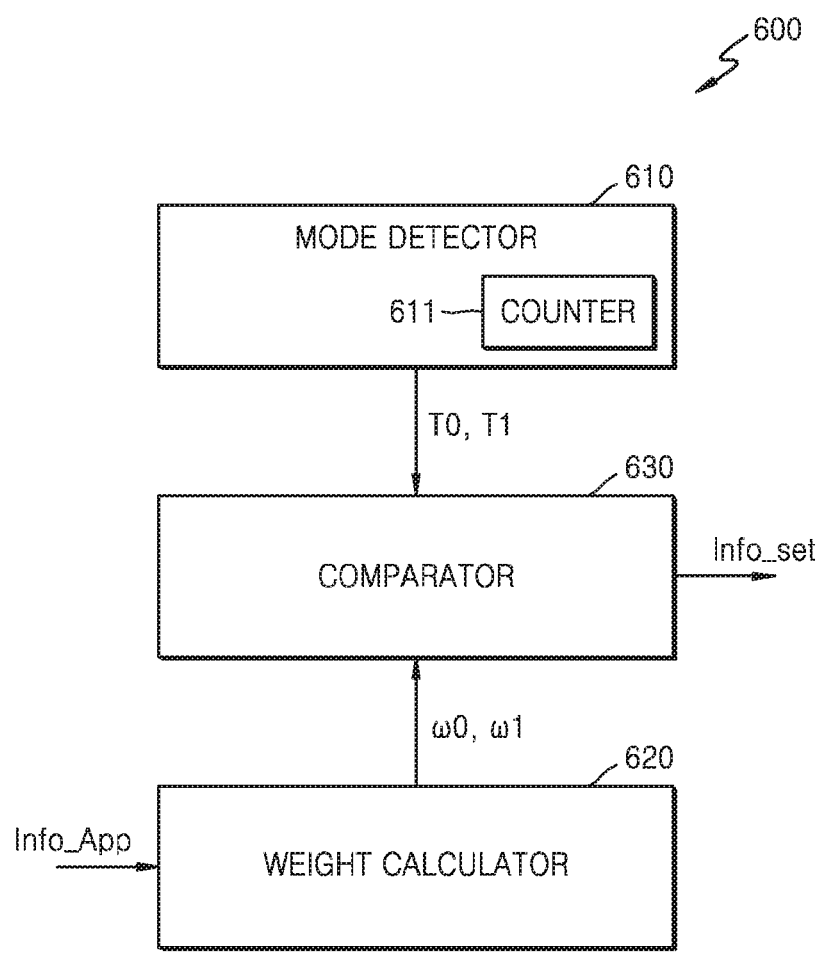
FIG. 10 is a block diagram illustrating another implementation example of a memory controller.

FIG. 10 is a block diagram illustrating another implementation example of a memory controller.

Referring to FIG. 10, a memory controller 600 may include a mode detector 610, a weight calculator 620, and a comparator 630. Mode detector 610 may include a counter 611. However, as in the above-described embodiments, counter 611 may be illustrated as being disposed outside mode detector 610.

Mode detector 610 may provide comparator 630 with information associated with a power down mode period T0 and a wake-up period T1, based on the above-described various counting operations. Also, weight calculator 620 may calculate one or more weight values to be applied in a comparison operation and may provide the one or more weight values to comparator 630. For example, first and second weight values ω0 and ω1 may be calculated by weight calculator 620. Also, for example, weight calculator 620 may provide comparator 630 with the first and second weight values ω0 and to ω1 calculated as predetermined values, or may provide comparator 630 with the first and second weight values ω0 and to ω1 having values which vary based on one or more pieces of information. According to an embodiment, weight calculator 620 may receive information Info_App associated with a frequency or number of executions of a program by a user in a system to which memory controller 600 is applied, and may calculate the first and second weight values ω0 and to ω1, based on the information Info_App.

Comparator 630 may generate control information Info_set for changing a setting value through a comparison operation in which the first and second weight values ω0 and ω1 are reflected. For example, comparator 630 may compare a value obtained by multiplying the power down mode period T0 by the first weight value ω0 and a value obtained by multiplying the wake-up period T1 by the second weight value ω1 to generate the control information Info_set.

FIGS. 11A and 11B are tables showing an example where a setting value is changed based on an operation of the memory controller of FIG. 10.

Referring to FIG. 11A, a value (for example, a first weight multiplication result "ω0*T0") obtained by multiplying the power down mode period T0 by the first weight value ω0 and a value (for example, a second weight multiplication result "ω1*T1") obtained by multiplying the wake-up period T1 by the second weight value ω1 may be compared with each other, and when the first weight multiplication result "ω0*T0" is greater than the second weight multiplication result "ω1*T1", the setting value N may decrease by α. On the other hand, when the first weight multiplication result "ω0*T0" is less than the second weight multiplication result "ω1*T1", the setting value N may increase by α. Furthermore, when the first weight multiplication result "ω0*T0" is equal or similar to the second weight multiplication result "ω1*T1", the setting value N may be maintained without being changed.

When the first weight value ω0 is assigned as a large value, there is a high possibility that the first weight multiplication result "ω0*T0" is greater than the second weight multiplication result "ω1*T1", and thus, a frequency or number of decreases of the setting value N may increase. Therefore, a driving method may be quickly changed in order for a DRAM to be suitable for the low power characteristic. On the other hand, when the second weight value ω1 is assigned as a large value, there is a high possibility that the first weight multiplication result "ω0*T0" is less than the second weight multiplication result "ω1*T1", and the driving method may be quickly changed in order for the DRAM to be suitable for the high performance characteristic.

According to an embodiment, values of the first and second weight values ω0 and ω1 may be changed based on the information Info_App.

A system to which the memory controller and the DRAM are applied may include various kinds of processors such as a graphics processing unit (GPU) and a CPU, and moreover, various kinds of programs executed by the GPU and/or the CPU may be installed in the system. For example, based on a system user, a frequency or number of executions of a high-specification program (for example, a game program, etc.), which has a high GPU usage rate, may be large, or a frequency or number of executions of a low-specification program (for example, a Web browser, etc.), which does not apply a large burden to the CPU, may be large. In this case, when the high-specification program is executed, a frequency or number of accesses to the DRAM is very large, and thus, a time period or interval for which an idle state is maintained may be short. On the other hand, when the low-specification program is executed, the frequency or number of accesses to the DRAM is very small, and thus, the time period or interval for which the idle state is maintained may be long.

Weight calculator 620 may receive the information Info_App associated with a kind of a program executed by the user and may calculate the first and second weight values $\omega 0$ and $\omega 1$, based on the information Info_App. For example, a frequency or number of executions of a high-specification program, which has a high GPU usage rate, may be determined based on the information Info_App, and when the frequency number of execution of the high-specification program increases, a value of the first weight value $\omega 0$ may decrease, or a value of the second weight value $\omega 1$ may increase. On the other hand, when the frequency or number of executions of the low-specification program increases, the value of the first weight value $\omega 0$ may increase, or the value of the second weight value $\omega 1$ may decrease.

For example, when the value of the first weight value $\omega 0$ decreases or the value of the second weight value $\omega 1$ increases, a case where the second weight multiplication result "$\omega 1*T1$" is greater than the first weight multiplication result "$\omega 0*T0$" may occur frequently, and a value of the setting value N may be changed to a large degree. Therefore, a frequency pr number of entries of the DRAM into a power down mode may decrease, and the DRAM may be driven to be suitable for the high performance characteristic.

In the above-described embodiment, an example where the information Info_App based on a kind of an executed program is used has been described, but other embodiments are possible. In other embodiments, the system to which the memory controller and the DRAM are applied may include a plurality of processors having various performance, and the information Info_App may be generated based on execution states of the processors (for example, the performances and the number of processors accessing the DRAM).

Figure 12:
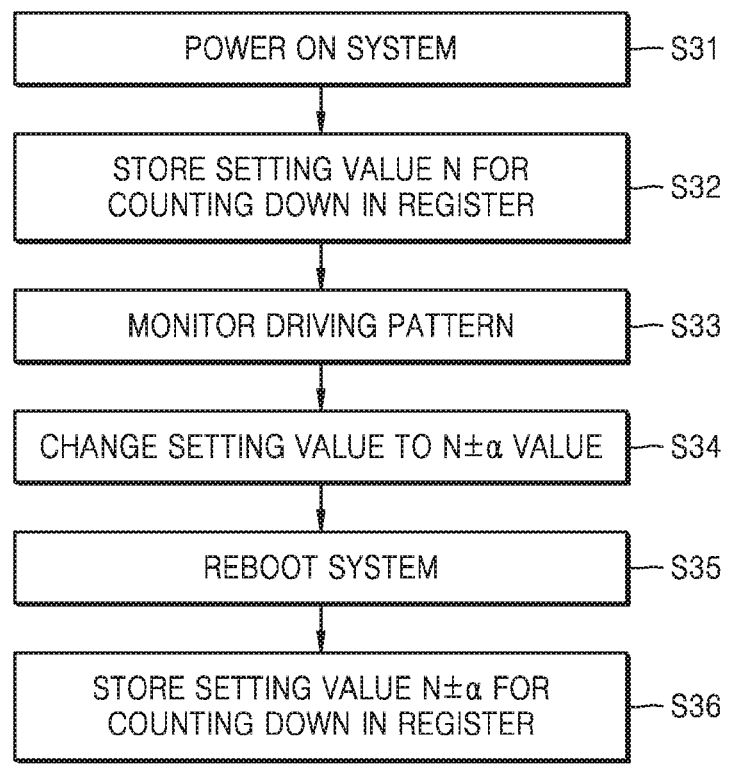
FIG. 12 is a flowchart illustrating another exemplary embodiment of an operating method of a memory controller.

FIG. 12 is a flowchart illustrating another exemplary embodiment of an operating method of a memory controller.

Referring to FIG. 12, the memory controller may include a register that stores a setting value associated with entry into a power down mode. A power of a system including the memory controller and a DRAM may be turned on in operation S31, and a setting value N for counting down may be stored in the register in operation S32. The setting value N initially stored in the register may be non-volatilely stored in a storage device included in the system, and the setting value N may be loaded into the register.

Moreover, according to the above-described embodiments, the memory controller may monitor a driving pattern of the DRAM in operation S33. Also, the setting value stored in the register may be changed to N±α, based on a result obtained by monitoring the driving pattern in operation S34. For example, when it is determined that the DRAM is driven based on the low power characteristic, the setting value may be changed to N−α, and when it is determined that the DRAM is driven based on the high performance characteristic, the setting value may be changed to N+α.

A setting value obtained through the change may be reflected in real time while the system is operating. Also, when rebooting the system, the system may be driven so that the setting value obtained through the change is immediately applied. For example, the setting value obtained through the change may be periodically or aperiodically updated in the storage device included in the system. Subsequently, the system including the memory controller may be rebooted in operation S35, and as the system is rebooted, a setting value associated with entry of the DRAM into the power down mode may be stored in the register of the memory controller. At this time, a setting value (for example, N±α) which is finally changed and updated in the storage device may be stored in the register in the rebooting operation in operation S36.

According to the above-described embodiment, a setting value changed based on a driving pattern of a user may be stored in the register of the memory controller in a subsequent rebooting operation. Therefore, when rebooting the system, a setting value suitable for a use characteristic of the user may be initially set (or loaded) to the register, and the DRAM may be more quickly driven in a state which is suitable for the use characteristic of the user.

FIG. 13 is a table showing another example of each of a period comparison operation and a setting value change operation.

Referring to FIG. 13, a result of a difference value of period comparison may be classified into a plurality of stages (for example, first to kth stages), and a setting value may be differently changed based on a result of the classification. For example, as in the above-described embodiment, a difference value "T0−T1" or "$\omega 0*T0−\omega 1*T1$" between a power down mode period T0 and a wake-up period T1 may be calculated, and one of the first to kth stages may be determined based on the difference value.

For example, when it is assumed that a DRAM operates based on the high performance characteristic, the power down mode period T0 may be less than the wake-up period T1, and thus, a setting value of α register may increase in comparison with N. Also, a degree to which the DRAM is driven with high performance may vary, and when the high performance characteristic increases more, an absolute value of a difference between the power down mode period T0 and the wake-up period T1 may have a relatively large value. For example, when the DRAM is driven with high performance, in a case corresponding to the first stage where a difference value "T0−T1" is relatively small, the setting value may increase by α, but in a case corresponding to the kth stage where the difference value "T0−T1" is relatively large, the setting value may increase by k*α.

Figure 14:
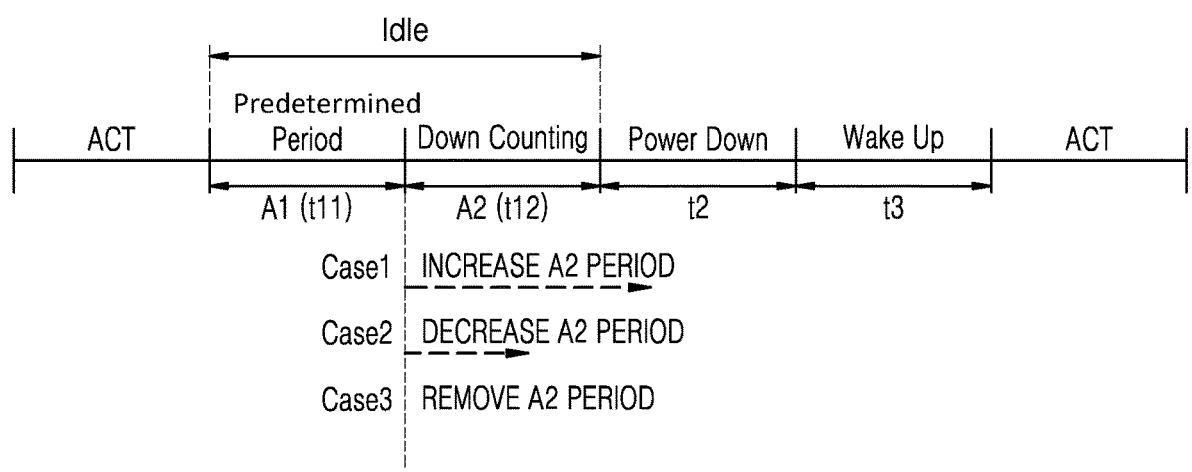
FIG. 14 is a diagram illustrating an example of various periods of a DRAM.

FIG. 14 is a diagram illustrating an example of various periods of a DRAM.

Referring to FIG. 14, the DRAM may normally operate during an active period Act, and as access to the DRAM does not occur, the DRAM may enter an idle period Idle. The idle period Idle may include a first period A1 having a fixed time period or interval and a second period A2 where a count down operation is performed. Also, after the first period A1 having the fixed time period or interval elapses, the count down which starts from a setting value N may be first performed in the second period A2, and when access to the DRAM does not occur while the count down is being performed on the setting value N, the DRAM may enter a power down mode Power Down. Also, when access to the DRAM occurs in a power down mode period, the DRAM may undergo a wake-up period Wake Up and may enter the active period Act.

According to the above-described embodiments, a time period or interval t2 for which the power down mode Power Down is maintained may be detected, and the time period or interval t2 for which the power down mode is maintained may be compared with a reference value. For example, a time period or interval t3 taken in the wake-up period Wake Up may have a constant time based on a predetermined specification, and the time period or interval t2 for which the power down mode is maintained may be compared with the time period or interval t3 taken in the wake-up period Wake Up. Also, a setting value (for example, N) for counting down for entering the power down mode Power Down may be changed based on a result of the comparison.

According to an embodiment, when the setting value is changed to a value greater than N, the second period A2 where counting down is performed may increase, and thus, a total maintenance period "t11+t12" of the idle period Idle for entering the power down mode may increase. On the other hand, when the setting value is changed to a value less than N, the second period A2 where counting down is performed may decrease, and thus, the total maintenance period "t11+t12" of the idle period Idle for entering the power down mode may decrease. Also, when the DRAM is continuously driven based on the low power characteristic, the second period A2 may continuously decrease, and depending on the case, the second period A2 may be removed from the idle period Idle.

According to an embodiment, the setting value stored in the register may correspond to a total elapsed time of the idle period Idle. Alternatively, the setting value stored in the register may correspond to a counting value corresponding to the second period A2 for counting down.

Figure 15:
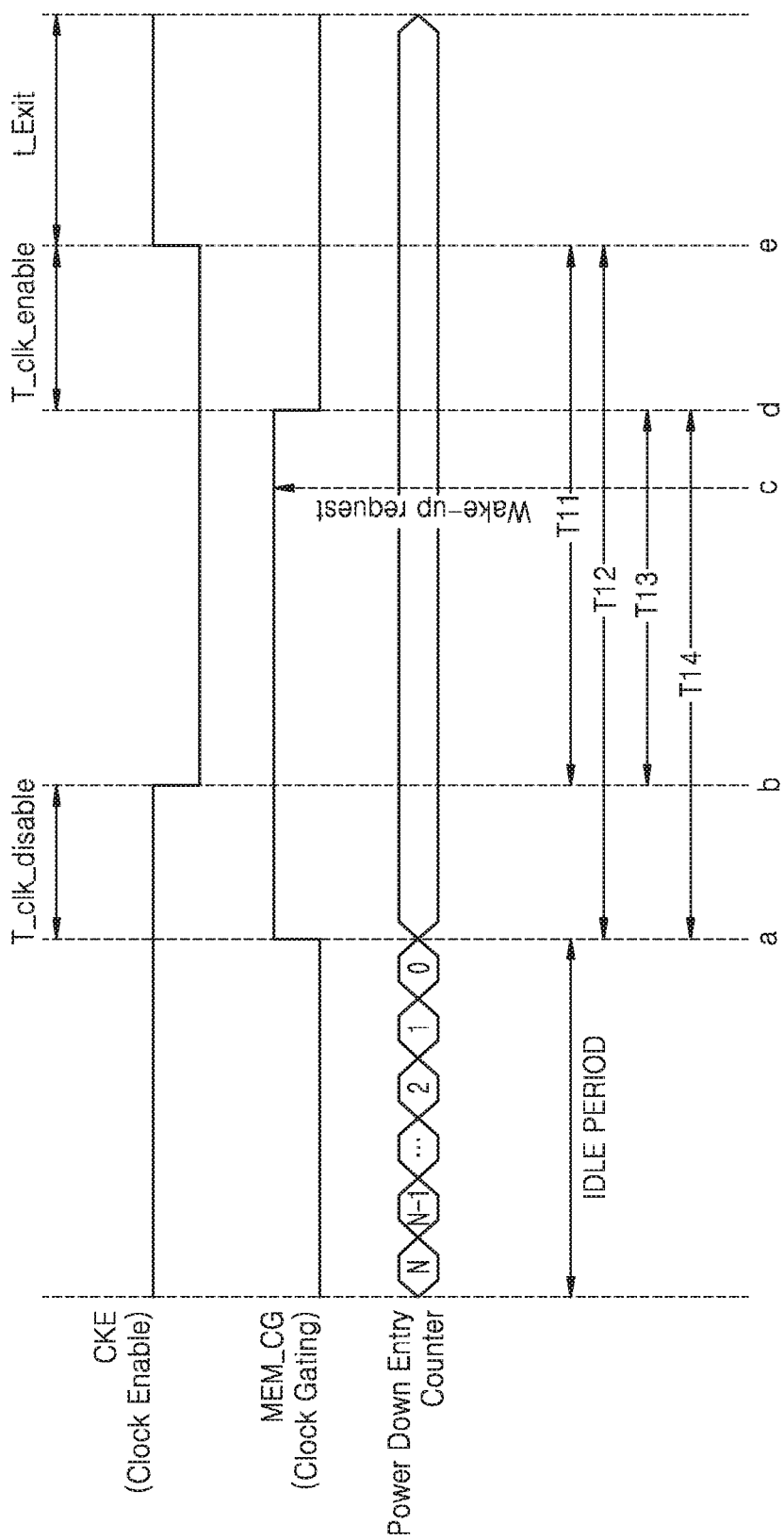
FIG. 15 is a diagram illustrating an example of various periods of a power down mode for determining a driving pattern of a DRAM.

FIG. 15 is a diagram showing an example of various periods of a power down mode for determining a driving pattern of a DRAM.

Referring to FIG. 15, as the DRAM enters an idle period, a clock enable signal CKE may have a logic high state, and a clock gating signal MEM_CG may have a logic low state. Also, a memory controller may count a time period or interval for which the idle state is maintained, and for example, the memory controller may perform a down counting operation of decreasing an N value by −1 each time.

A preparation operation may be performed in order for the DRAM to enter the power down mode at a time a when the N value is counted all the way down. To this end, the clock gating signal MEM_CG may be changed to a logic high level, and the clock enable signal CKE may be changed to a logic low level at a time b after a certain time period or interval T_clk_disable elapses. Also, access to the DRAM may occur at an arbitrary time c in the power down mode, the clock gating signal MEM_CG may be changed to a logic low level at a time d for changing the DRAM to an active mode, and the clock enable signal CKE may be changed to a logic high level at a time e after a certain time period or interval T_clk_enable elapses.

According to an exemplary embodiment, in detecting a period of a power down mode of the DRAM for determining a driving pattern of the DRAM, a start time and an end time of the power down mode may be variously set. For example, a period between two times selected from among the times a to e may be defined as the period of the power down mode. In FIG. 15, an example where a time period or interval T11 between the time b and the time e, a time period or interval T12 between the time a and the time e, a time period or interval T13 between the time b and the time d, and a time period or interval T14 between the time a and the time d are each defined as the power down mode and the periods are compared with various reference values Tref1 to Tref4 is illustrated, but the present embodiment may be variously modified without being limited thereto.

Figure 16A:
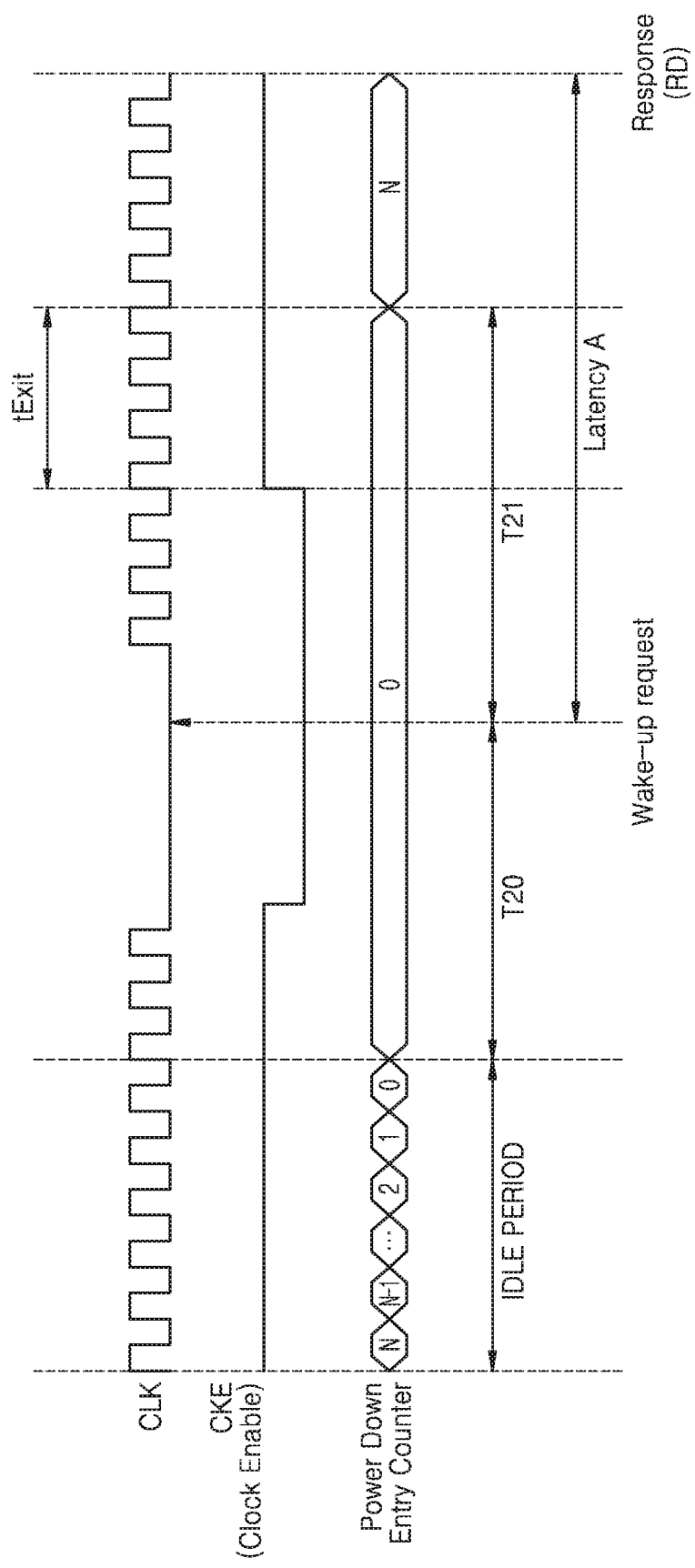
FIGS. 16A and 16B are diagrams illustrating an example of data read latency when a DRAM according to an exemplary embodiment is driven.
Figure 16B:
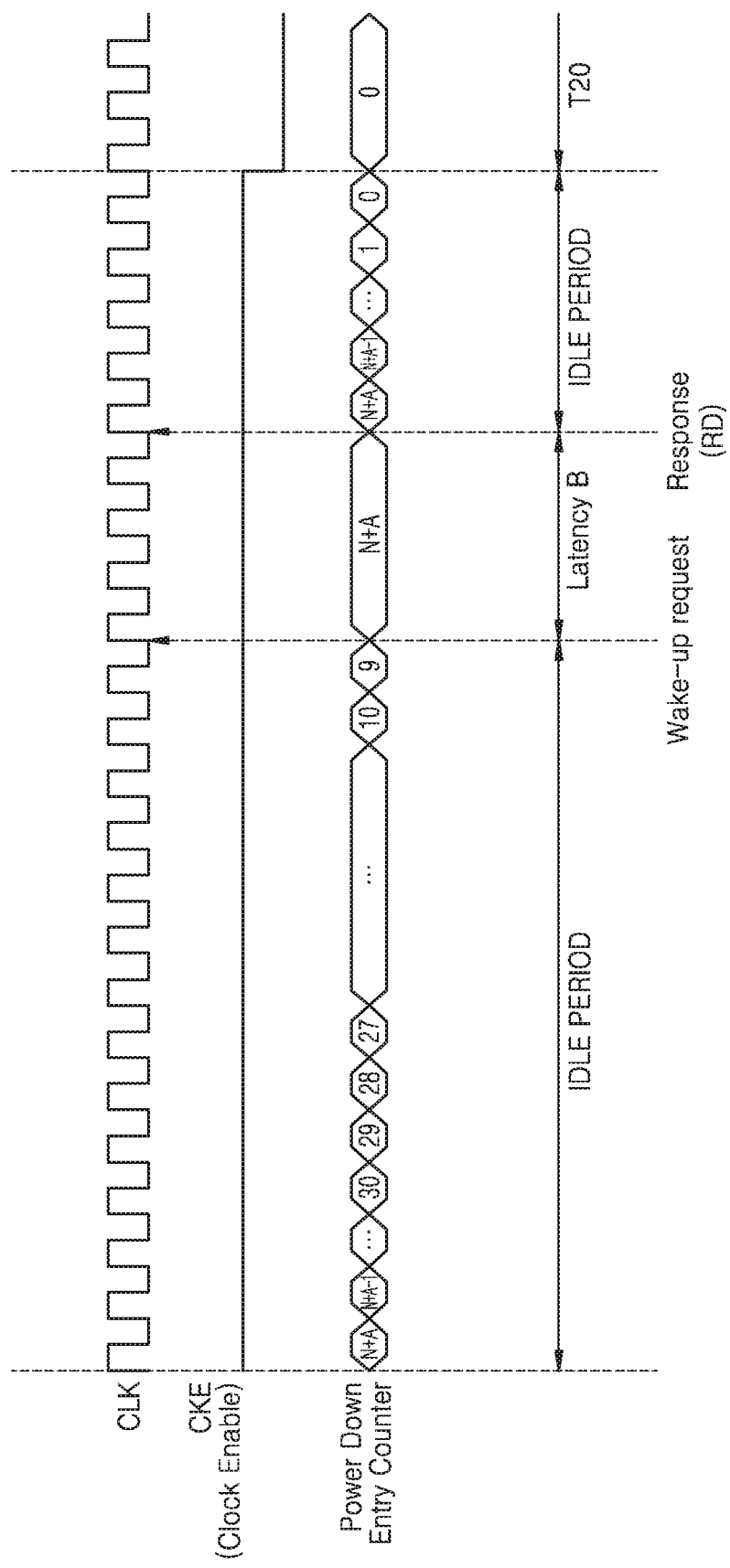

FIGS. 16A and 16B are diagrams showing an example of a data read latency when a DRAM according to an exemplary embodiment is driven. FIG. 16A shows an example of an operation performed in a period before a setting value is changed, and FIG. 16B shows an example of an operation performed in a period after the setting value is changed suitably for the high performance characteristic.

Referring to FIG. 16A, the setting value may have a relatively small value N, and after counting down by N is completed, the DRAM may enter a power down mode. Also, a wake-up request for a memory operation such as data read may occur in the power down mode, and the DRAM may undergo a wake-up period T21 and may enter an active period enabling the DRAM to normally operate. Also, the DRAM may enter the active period, and then, after a certain number of clocks elapse, a response (for example, transmission of read data RD) to the request may be completed. As shown in FIG. 16A, a latency A from a time when the wake-up request occurs to a time when the response is completed may have a relatively large value.

According to the above-described embodiment, the setting value may be changed based on a result obtained by comparing a period T20 with a period T21, and for example, the setting value (for example, a counting value) may increase in order for the DRAM to operate suitably for the high performance characteristic. As shown in FIG. 16B, counting down may be performed from an N+A value in an idle period, and a wake-up request for a memory operation such as data read may occur before the counting down the N+A value is completed, whereby the DRAM may performed a memory operation based on the request without entering the power down mode.

For example, the DRAM may receive a data read request, and then, after a certain number of clocks elapse, a response (for example, transmission of read data RD) to the request may be completed. As shown in FIG. 16B, a latency B from a time when the wake-up request occurs to a time when the response is completed may have a relatively small value.

According to the embodiments of FIGS. 16A and 16B, in an operation of the DRAM, a latency taken from a request to a response may be continuously changed while the DRAM is operating. For example, as a frequency or number of entries into the power down mode increases, a frequency or number of instances where a latency occurring in a data read operation has the relatively long latency A as shown in FIG. 16A may increase. On the other hand, as the frequency or number of entries into the power down mode decreases, a frequency or number of instances where the latency occurring in the data read operation has the relatively short latency B as shown in FIG. 16A may increase.

Figure 17:
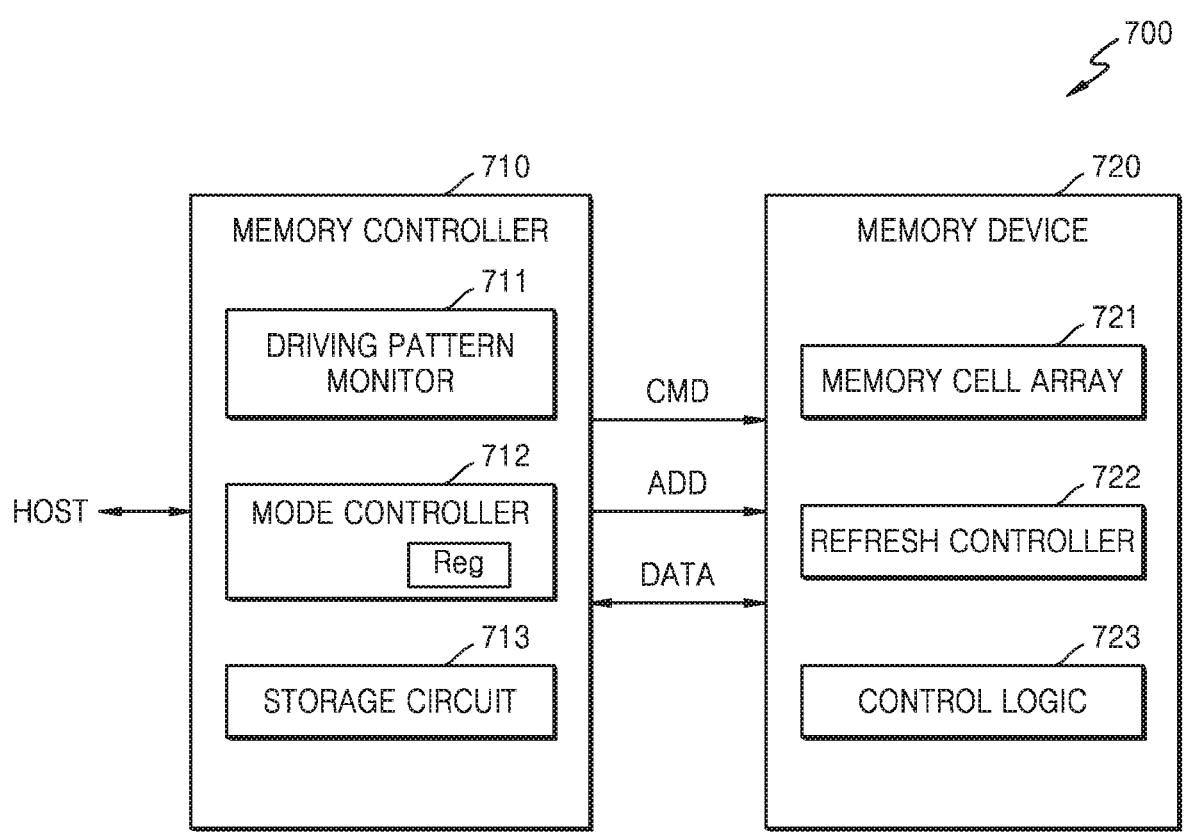
FIG. 17 is a block diagram illustrating another exemplary embodiment of a memory system.

FIG. 17 is a block diagram illustrating an exemplary embodiment of a memory system 700.

Referring to FIG. 17, the memory system 700 may include a memory controller 710 and a memory device 720. Memory device 720 may include a memory cell array 721, a refresh controller 722, and a control logic 723. Also, memory controller 710 may include a driving pattern monitor 711, a mode controller 712, and a storage circuit 713. Driving pattern monitor 711 and mode controller 712 may perform a driving pattern monitoring operation, a setting value changing operation, and a mode control operation as in the above-described embodiments. Also, storage circuit 713 may store a setting value, and the setting value may be changed according to control by driving pattern monitor 711.

Refresh controller 722 may control a refresh operation on a plurality of memory cells included in memory cell array 721. For example, in the active mode, refresh controller 722 may refresh the memory cells, based on control by memory controller 710. Also, in the power down mode, refresh controller 722 may control a self-refresh operation of refreshing the memory cells irrespective of control by memory controller 710.

If memory device 720 includes a volatile memory, memory device 720 may include a memory such as double data rate synchronous dynamic random access memory (DDR SDRAM), low power double data rate (LPDDR) SDRAM, graphics double data rate (GDDR) SDRAM, or Rambus dynamic random access memory (RDRAM). However, the present embodiments are not limited thereto. In other embodiments, memory device 720 may include a non-volatile memory such as magnetic RAM (MRAM), ferroelectric RAM (FeRAM), phase change RAM (PRAM), or resistive RAM (ReRAM).

Memory device 720 may be a semiconductor package including one or more memory chips, or may be a memory module where a plurality of memory chips are mounted on a module board. Alternatively, in FIG. 17, memory controller 710 and memory device 720 are illustrated as individual elements, but without being limited thereto, memory system 700 may be implemented as a system where a memory control function and a memory cell array are integrated into one semiconductor package.

Figure 18:
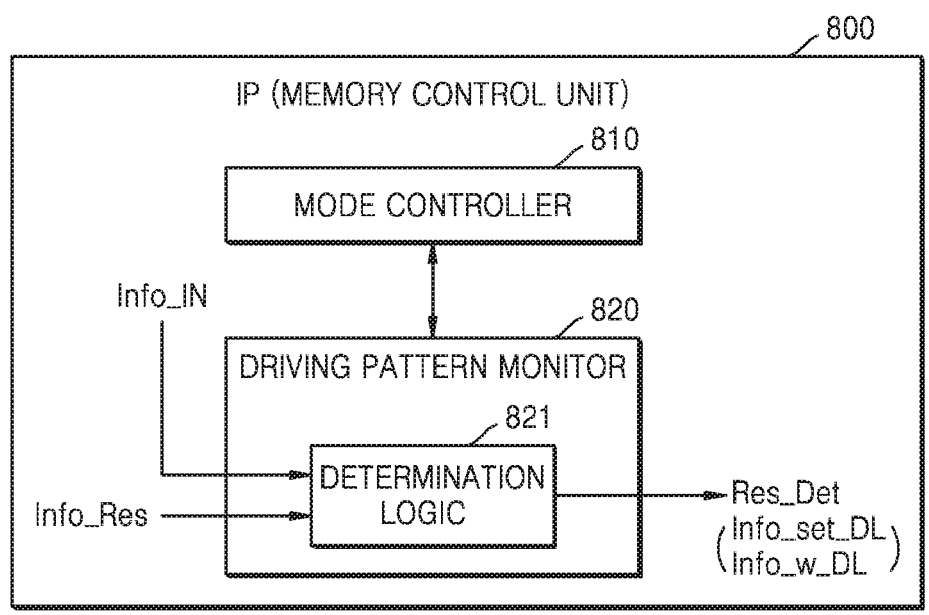
FIG. 18 is a block diagram illustrating an IP according to a modified embodiment.

FIG. 18 is a block diagram illustrating an IP 800 according to a modified embodiment. In FIG. 18, an example is illustrated where a driving pattern monitoring operation is performed by a determination logic such as a machine learning logic. Also, a memory control unit may be provided as an example of an IP, and a driving pattern monitor 820 included in IP 800 may further include a determination logic 821 that performs the driving pattern monitoring operation according to the above-described embodiments, and performs a determination operation based on machine learning. Also, a mode controller 810 may output a mode control signal to a memory device as in the above-described embodiments.

Determination logic 821 may receive various pieces of information associated with IP 800 and may perform the determination operation based on the received information. For example, determination logic 821 may receive, as training information, information used to monitor a driving pattern, or various pieces of information Info_IN and Info_Res associated with a driving pattern monitoring result, in association with the driving pattern monitoring operation according to the above-described embodiments, and may perform the determination operation based on the received information. For example, the various pieces of information Info_IN and Info_Res may include a register setting value, information about an executed application, a maintenance time period or interval of an idle state, and a maintenance time period or interval of a power down mode, in association with driving of a memory system. Determination logic 821 may output various determination results Res_Det associated with the control of a mode of a memory device, based on the machine learning.

For example, determination logic 821 may determine whether a currently set register setting value is appropriate or not, based on the machine learning and may determine an optimal register setting value based on a kind of an executed application. Also, determination logic 821 may output, as a machine learning result, a setting value Info_set_DL in association with the control of the mode of the memory device, or may output weight/offset information Info_w_DL such as the above-described weight value or an offset for controlling the weight value.

According to an embodiment, in a case where an action pattern of a user is based on a constant rule, a driving characteristic monitoring operation and a mode control operation may be performed according to the above-described embodiments. For example, if the action pattern departs from the constant rule, as described above, the mode control operation may be quickly performed suitably for an actual action pattern of the user by using pieces of information Info_set_DL and Info_w_DL based on a machine learning result.

As described above, in the memory controller, the AP, and the operating method of the memory controller according to the embodiments, a driving pattern of an I/O device based on a characteristic of a user may be monitored, and the I/O device may be controlled in real time in order for the I/O device to be driven according to a high performance characteristic or driven according to a low power characteristic, based on a result of the monitoring, thereby enabling optimized control to be performed on the I/O device adaptively to the user.

The various operations of methods described above may be performed by any suitable means capable of performing the operations, such as various hardware and/or software component(s), circuits, and/or module(s).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concept has been particularly shown and described with reference to embodiments thereof, it will be understood that various changes in form and details may be made therein without departing from the spirit and scope of the following claims.

What is claimed is:

1. A memory controller for controlling a memory device, the memory controller comprising:
   a driving characteristic monitor circuit configured to monitor a driving pattern of the memory device by determining a time for which the memory device maintains a power down mode, and further configured to change a setting value associated with control of operation performance of the memory device, based on a result of the monitoring;
   a mode controller circuit configured to control, while the memory device is operating, the operation performance of the memory device by varying a maintenance time period of an idle state corresponding to a condition for allowing the memory device to enter the power down mode, based on the setting value;

a storage circuit configured to non-volatilely store the setting value; and
a register, wherein the register is configured to have the setting value read from the storage circuit and loaded into the register,
wherein a changed setting value obtained through the change of the setting value is updated in the storage circuit, and when the memory controller is initially driven again, the changed setting value is initially loaded from the storage circuit into the register, and
wherein the driving characteristic monitor circuit comprises:
a time detector configured to output first information based on a result obtained by detecting a time period for which the memory device maintains the power down mode; and
a determiner configured to receive the first information, monitor the driving pattern of the memory device by comparing the first information with second information associated with a wake-up period for allowing the memory device to enter an active mode, and output third information for changing the setting value of the register, based on the result of the monitoring.

2. The memory controller of claim 1, wherein when the result of the monitoring indicates that the memory device operates based on a high performance characteristic, the mode controller circuit decreases a frequency of entries of the memory device into the power down mode, based on the changed setting value obtained through the change of the setting value, and
when the result of the monitoring indicates that the memory device operates based on a low power characteristic, the mode controller circuit increases the frequency of entries of the memory device into the power down mode, based on the changed setting value.

3. The memory controller of claim 1, wherein the setting value is changed from a first setting value to a second setting value, based on the result of the monitoring,
wherein the mode controller circuit allows the memory device to enter the power down mode after the idle state is maintained for a first time period corresponding to the first setting value, and
wherein, after the setting value is changed, the mode controller circuit allows the memory device to enter the power down mode after the idle state is maintained for a second time period corresponding to the second setting value.

4. The memory controller of claim 1, wherein
before the setting value is changed, the memory controller provides a data read request to the memory device and receives read data after a first latency, and
after the setting value is changed, the memory controller provides the data read request to the memory device and receives the read data after a second latency having a second value different from a first value of the first latency.

5. A method of operating a memory controller for controlling a memory device, the method comprising:
allowing the memory device to enter a power down mode after an idle state is maintained for a first time period corresponding to a first setting value which is currently set;
when access to the memory device occurs, allowing the memory device to transition from the power down mode into an active state;
changing the first setting value to a second setting value based on a result obtained by monitoring a driving pattern of the memory device by determining a maintenance time of the power down mode;
when the idle state is maintained for a second time period different from the first time period, allowing the memory device to enter the power down mode, based on the second setting value; and
performing a wake-up operation during a wake-up period for allowing the memory device to enter the active state,
wherein:
the power down mode, which is entered according to the first setting value, is maintained for a third time period, and the wake-up period is maintained for a fourth time period, and
the first setting value is changed to the second setting value, based on a result obtained by comparing the third time period and the fourth time period.

6. The method of claim 5, wherein:
when the third time period is less than the fourth time period, the second setting value is greater than the first setting value, and
when the third time period is greater than the fourth time period, the second setting value is less than the first setting value.

7. A method of operating a memory controller for controlling a memory device, the method comprising:
allowing the memory device to enter a power down mode after an idle state is maintained for a first time period corresponding to a first setting value which is currently set;
when access to the memory device occurs, allowing the memory device to transition from the power down mode into an active state;
changing the first setting value to a second setting value based on a result obtained by monitoring a driving pattern of the memory device by determining a maintenance time of the power down mode; and
when the idle state is maintained for a second time period different from the first time period, allowing the memory device to enter the power down mode, based on the second setting value,
wherein the power down mode, which is entered according to the first setting value, is maintained for a third time period, and
when the third time period is less than a first reference value, the second setting value is greater than the first setting value,
when the third time period is greater than the first reference value and less than a second reference value, the second setting value is equal to the first setting value, and
when the third time period is greater than the second reference value, the second setting value is less than the first setting value,
wherein the first reference value is less than the second reference value.

8. A method of operating a memory controller for controlling a memory device, the method comprising:
allowing the memory device to enter a power down mode after an idle state is maintained for a first time period corresponding to a first setting value which is currently set;
when access to the memory device occurs, allowing the memory device to transition from the power down mode into an active state;
changing the first setting value to a second setting value based on a result obtained by monitoring a driving pattern of the memory device by determining a maintenance time of the power down mode; and when the idle state is maintained for a second time period different from the first time period, allowing the memory device to enter the power down mode, based on the second setting value wherein:

the first time period comprises a first counting period, and the second time period comprises a second counting period, and the first setting value corresponds to a first counting value N (where N is an integer equal to or more than two), and the second setting value corresponds to a second counting value N±α(where α is an integer equal to or more than one).

9. The method of claim 8, wherein counting down which starts from N is performed in the first counting period, and wherein counting down which starts from N±α is performed in the second counting period, and when the first counting value or the second counting value is all counted down, the memory controller allows the memory device to enter the power down mode.

10. A method of operating a memory controller for controlling a memory device, the method comprising:

allowing the memory device to enter a power down mode after an idle state is maintained for a first time period corresponding to a first setting value which is currently set;

when access to the memory device occurs, allowing the memory device to transition from the power down mode into an active state;

changing the first setting value to a second setting value based on a result obtained by monitoring a driving pattern of the memory device by determining a maintenance time of the power down mode; and when the idle state is maintained for a second time period different from the first time period, allowing the memory device to enter the power down mode, based on the second setting value, wherein the driving pattern of the memory device is monitored by detecting a maintenance time period of the power down mode which the memory device enters, based on the first setting value, wherein a first time is when a clock gating signal is shifted to a first state for allowing the memory device to enter the power down mode, a second time is when a clock enable signal is shifted to a second state, a third time is when the access occurs, a fourth time is when the clock gating signal is shifted to the second state for allowing the memory device to enter the active state, and a fifth time is when the clock enable signal is shifted to the first state, and wherein the maintenance time period of the power down mode is a time period between two times selected from among the first to fifth times.

11. A method of operating an application processor including one or more intellectual property blocks (IPs) which control a corresponding input/output (I/O) device, the method comprising:

controlling entry of the I/O device into a power down mode, based on a first setting value which is initially set;

when a system including the application processor is rebooted, changing the first setting value to a second setting value, based on detecting a maintenance time period of the power down mode of the I/O device; and controlling entry of the I/O device into the power down mode, based on the second setting value, wherein a clock enable signal provided to the I/O device is changed from an active state to an inactive state, for entering the power down mode, wherein a maintenance time period of the active state of the clock enable signal before the I/O device enters the power down mode is changed based on the second setting value, wherein the first setting value is a first counting value corresponding to a value N (where N is an integer equal to or more than two), and the second setting value is a second counting value corresponding to a value N±α (where α is an integer equal to or more than one), and wherein the I/O device enters the power down mode after an idle state is maintained for a first time period, based on a counting operation using the N value, and after the idle state is maintained for a second time period, the I/O device enters the power down mode, based on a counting operation using the value N±α.

12. The method of claim 11, wherein:

when the maintenance time period of the power down mode of the I/O device is less than a reference value, then the maintenance time period of the active state of the clock enable signal increases, and when the maintenance time period of the power down mode of the I/O device is greater than the reference value, then the maintenance time period of the active state of the clock enable signal decreases.

13. The method of claim 11, wherein each of the one or more IP blocks is a memory control unit, and the I/O device is a memory device provided outside the application processor.

14. The method of claim 11, further comprising:

maintaining the entered power down mode for a third time period, based on the first setting value; and undergoing a wake-up period corresponding to a fourth time period and allowing the I/O device to enter the active state, wherein the changing of the first setting value to the second setting value comprises comparing the third time period with the fourth time period by using at least one weighting value, and wherein the at least one weighting value varies based on a kind of a program executed by the application processor.

15. The method of claim 11, wherein the application processor outputs a power control signal, which controls an external power management integrated circuit (PMIC), for controlling power supplied to the I/O device, based on a frequency of the controlled entry of the I/O device into the power down mode.

* * * * *